United States Patent Office 3,253,867
Patented May 31, 1966

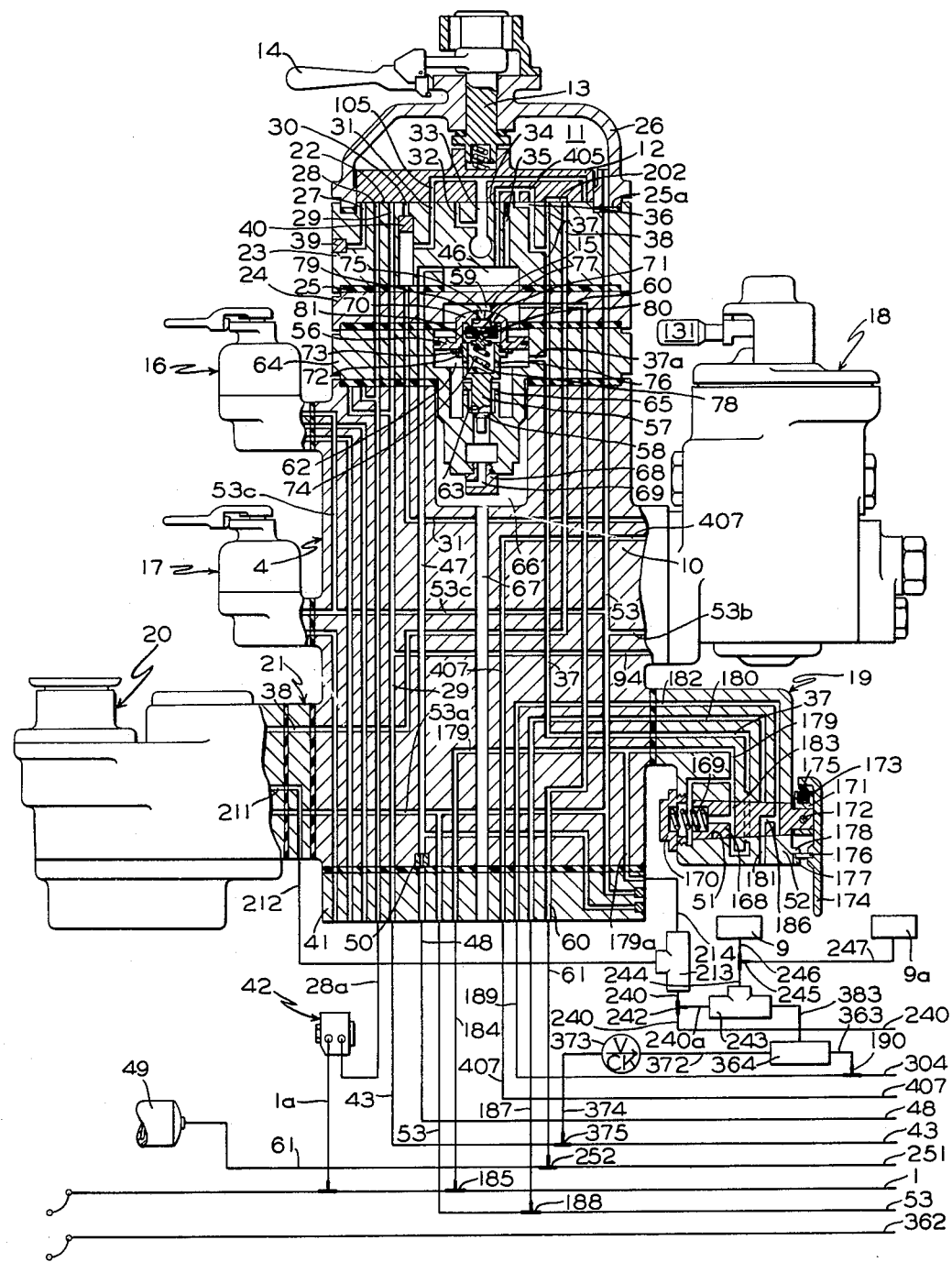

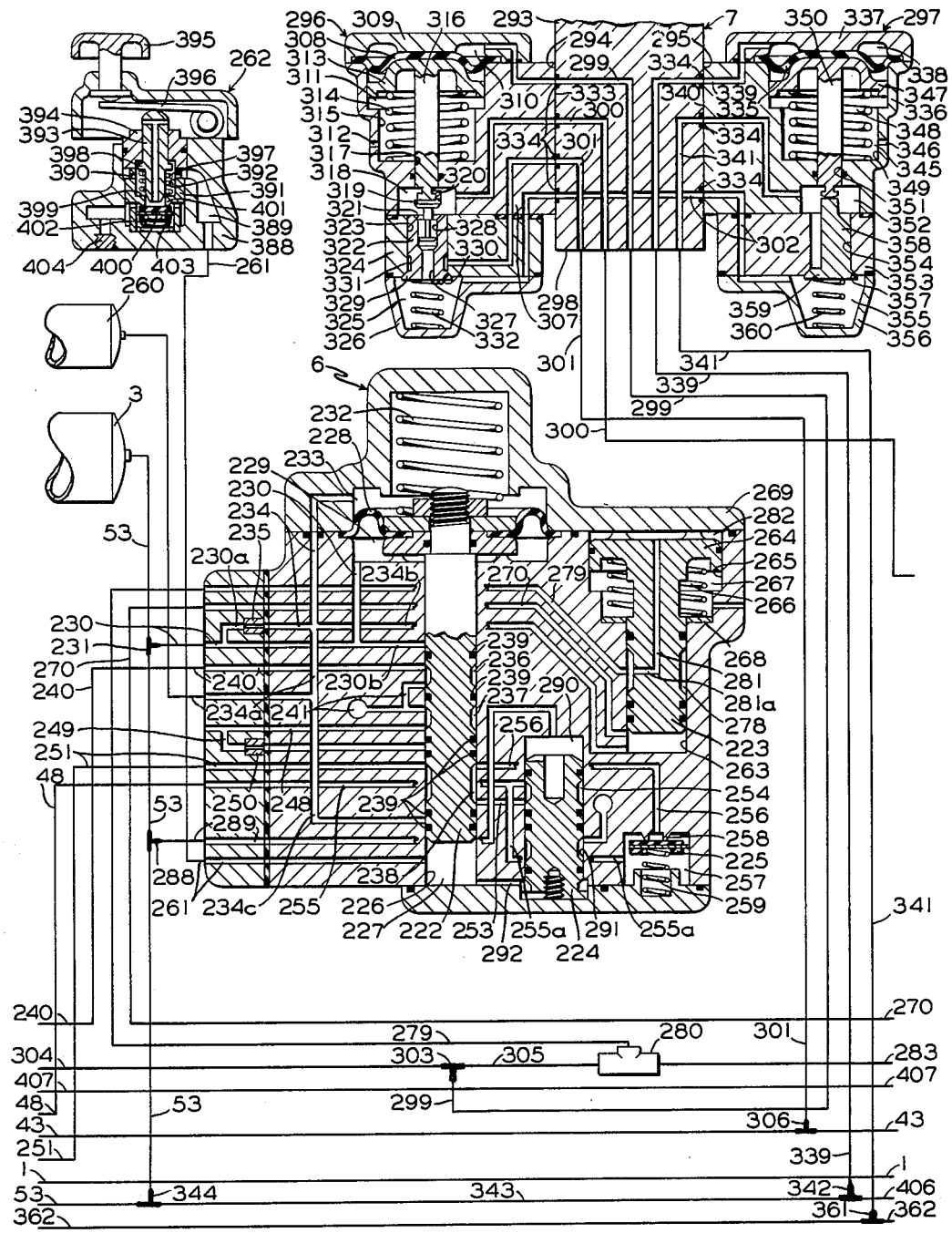

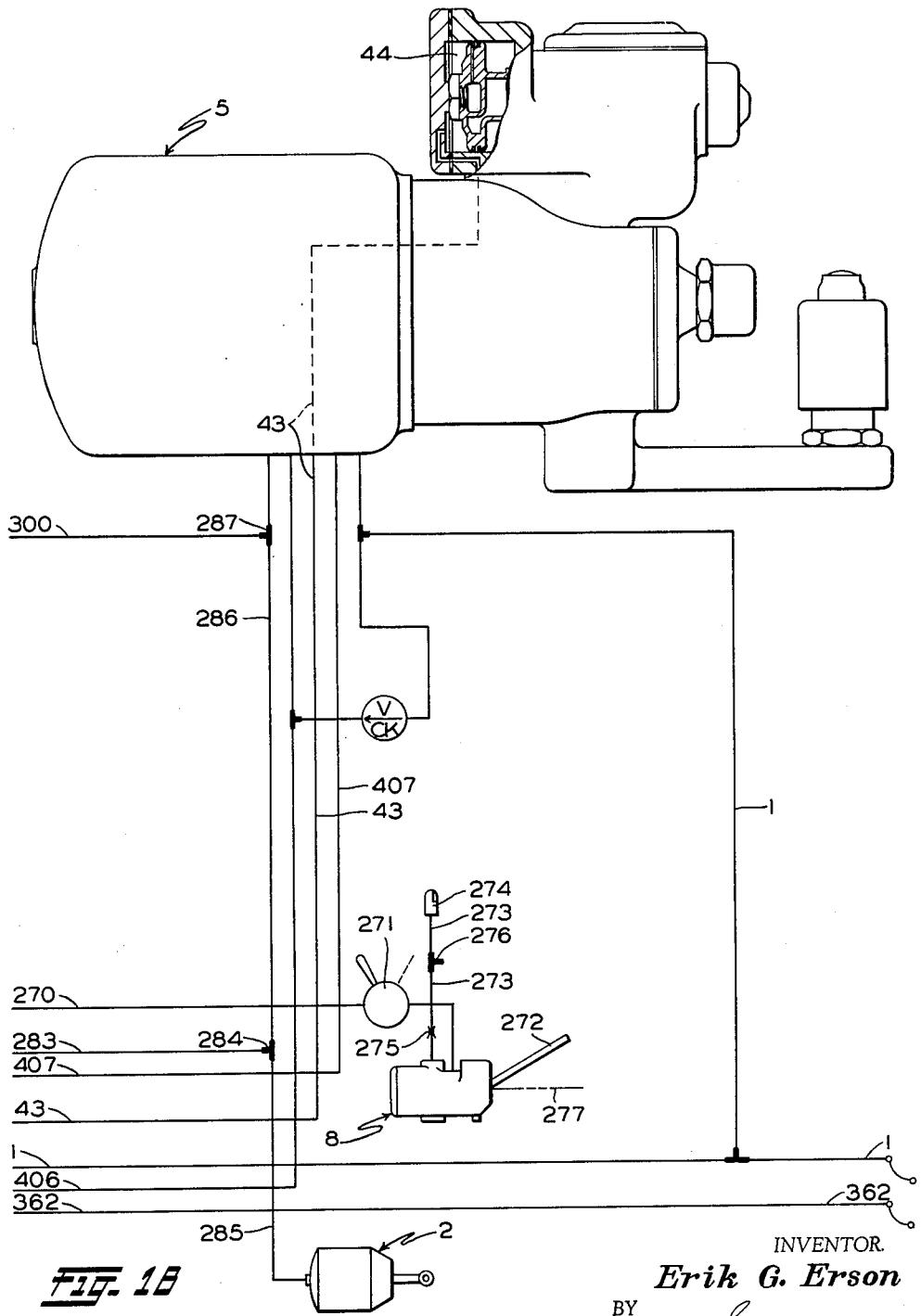

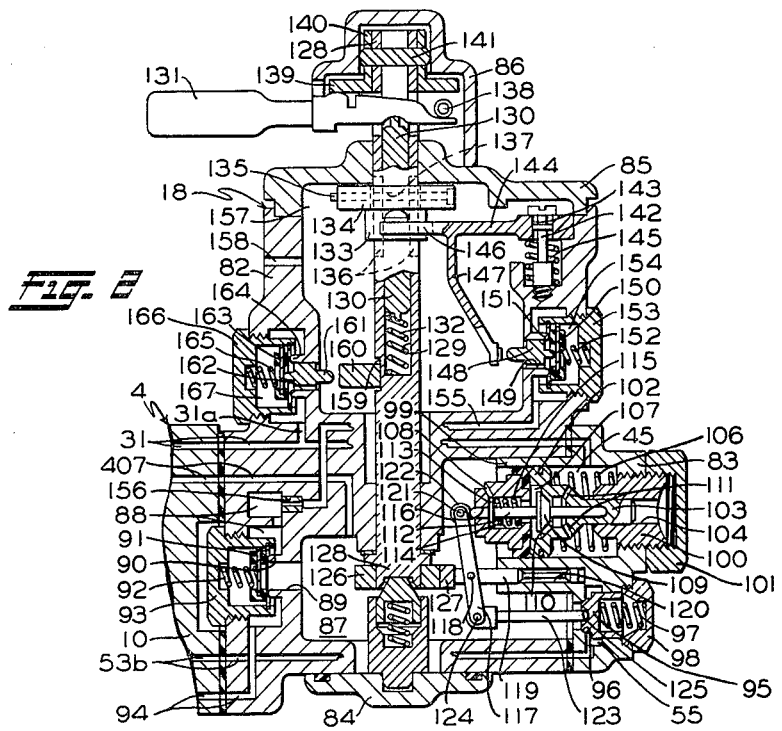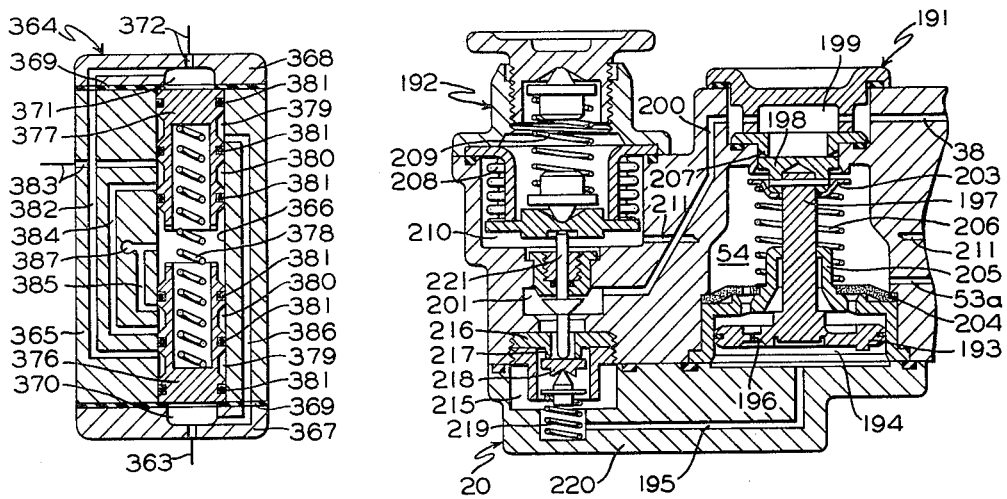

3,253,867
MULTIPLE-UNIT LOCOMOTIVE BRAKE CONTROL EQUIPMENT WITH SAFETY CONTROL
Erik G. Erson, Export, Pa., assignor to Westinghouse Air Brake Company, Wilmerding, Pa., a corporation of Pennsylvania
Filed Nov. 29, 1963, Ser. No. 326,821
7 Claims. (Cl. 303—14)

This invention relates to locomotive fluid brake apparatus of the type embodying an improved rotary type of brake valve device for providing so-called "automatic" control of brakes on a locomotive and the connected cars of a train, and, more particularly, to such brake apparatus embodying means for insuring the effecting of an automatic control application of brakes, sometimes referred to as a "safety control" application, upon the occurrence of a predetermined condition, for example, the incapacitation or sudden death of the locomotive engineer while the train is traveling along the track.

Locomotive brake equipments that operate on the so-called "automatic" principle of controlling the brakes are so constructed that an emergency application of the brakes is always effected upon the reduction of the pressure at an emergency rate in a normally charged brake pipe, such reduction of pressure at an emergency rate always occurring automatically upon a rupture of the brake pipe or at the discretion of the driver or engineer by manual operation of an engineer's automatic brake valve device.

Since, when hauling heavy tonnage trains at high speeds or over mountainous terrain, it is often necessary to employ two or more locomotives in multiple-unit operation, the engineer's automatic brake valve device on each locomotive is provided with a three-position brake pipe cut-out cock to condition the brake equipment on the locomotive so that the locomotive may operate as either the leading unit or as a trailing unit in multiple-unit operation or as a dead unit which may be placed between any two cars in a train, in which case the brakes on the dead unit will be controlled from the lead unit and will operate the same as the brakes on the cars in the train.

The locomotive engineer, if he so chooses, may intentionally, though against rules and regulations, eliminate the "automatic" control of the brakes on a locomotive operating light that is not coupled to a train of cars, so that a "safety control" brake application will not automatically occur should he become incapacitated, by (1) first effecting an emergency brake application of the brakes by manual operation of the engineer's brake valve device to cause a complete depletion of the pressure in the brake pipe, and (2) subsequently moving the three-position brake pipe cut-out cock to the position to condition the brake equipment on the locomotive for trailing unit operation in which position fluid under pressure is supplied from the main reservoir on the locomotive to a suppression portion of a brake application valve device so that the brake application valve device is conditioned to prevent a "safety control" application of the brakes should the engineer subsequently become incapacitated. The engineer may next effect a release of the previously effected emergency brake application by means of the independent brake valve device, in the usual manner well known to those skilled in the art of brake operation.

After the emergency brake application has been released, the engineer can thereafter operate the locomotive light, that is, without hauling a train of cars, and manually control the application and release of the brakes on the locomotive by means of the independent brake valve device. Such operation of the brakes on the locomotive is undesirable and dangerous for, should the engineer become incapacitated, there is no safety control mechanism available to automatically effect a brake application and thereby bring the locomotive to a stop.

Accordingly, it is the general purpose of this invention to provide a diesel-electric locomotive brake equipment of the type described above with a novel, small and inexpensive means which will effect a cut-off of the propulsion power supply and cut-out of the dynamic brake, if the locomotive is so equipped, each time the engineer effects an emergency application of the brakes on a locomotive operating light and subsequently turns the three-position cut-off cock from its "Lead" to its "Trail" position while the handle of the engineer's automatic brake valve device is in its "Emergency" position, or each time the engineer effects an emergency application of the brakes on the locomotive, then subsequently moves the handle of the engineer's automatic brake valve device from its "Emergency" position back to its "Service" position and, thereafter, first releases the emergency brake application on the locomotive by means of the independent brake valve device, then turns the three-position cut-out cock from its "Lead" position to its "Trail" position, and afterwards effects a brake application on the locomotive by means of the independent brake valve device to manually control the application and release of the brakes on the locomotive solely by operation of the independent brake valve device. The cutoff of the propulsion power and cutout of the dynamic brake each time the engineer resorts to either of the above-described intentional malpractices of locomotive brake operation should discourage the engineer from eliminating the "automatic" control of the brakes on a locomotive operating light.

According to the present invention, a propulsion power cut-off switch device and a dynamic brake cut-out switch device are so connected through suitable piping, a pair of double check valve devices, and a one-way check valve device to an engineer's brake valve device to provide for effecting the cut-off of propulsion power and cut-out of the dynamic brakes on the locomotive each time the locomotive engineer manually effects an automatic brake valve device controlled emergency brake application and subsequently resorts to the malpractice of turning the three-position cut-out cock from its "Lead" position to its "Trail" position to eliminate the occurrence of an automatic "safety control" application of the brakes on the locomotive, should the engineer become incapacitated, or each time he manually effects an automatic brake valve device controlled emergency brake application and subsequently resorts to the malpractice of (1) moving the handle of the automatic brake valve device from its "Emergency" position back to its "Service" position; (2) thereafter releasing the emergency brake application on the locomotive by means of the independent brake valve device; (3) then turning the three-position cut-out cock from its "Lead" position to its "Trail" position, and (4) afterwards effecting a brake application on the locomotive by means of the independent brake valve device.

More particularly, according to the present invention, there is provided in or for a locomotive fluid pressure braking apparatus the combination of a first double check valve device operated by fluid under pressure supplied from the main reservoir on the locomotive, when the three-position cut-out cock of an engineer's brake valve device is turned to its "Trail" position, to a position to establish a communication through which fluid under pressure supplied by operation of an engineer's automatic brake valve device to effect an emergency brake application or by operation of an independent brake valve device to effect a brake application on the locomotive may flow via a one-way flow check valve device disposed on the upstream side of the first double check valve device and a second double check valve device disposed on the downstream side of the first double check valve device to a propulsion power cut-off switch device and to a dynamic brake cut-out switch device to effect, respectively, a cut-off of the propulsion power and a cut-out of the dynamic brakes on the locomotive so that the locomotive will be brought to a complete stop.

Release of fluid under pressure from the propulsion power cut-off switch device and the dynamic brake cut-out switch device can be effected by the engineer turning the three-position cut-out cock from its "Trail" position back to its "Lead" position. Consequently, subsequent to thus releasing fluid under pressure from the propulsion power cut-off switch device, propulsion power is again supplied for driving the locomotive so that the engineer can now move it.

In the accompanying drawings:

FIG. 1, FIG. 1A and FIG. 1B, when taken together such that the right-hand edge of FIG. 1 is matched with the left-hand edge of FIG. 1A and the right-hand edge of FIG. 1A is matched with the left-hand edge of FIG. 1B, constitutes a diagrammatic view of a locomotive fluid pressure brake apparatus embodying the invention.

FIG. 2 is an elevational cross-sectional view, at an enlarged scale, of the independent brake valve portion of the engineer's brake valve device of FIG. 1 showing the structural details of this independent brake valve portion.

FIG. 3 is an elevational cross-sectional view, at an enlarged scale, of the feed valve portion of the engineer's brake valve device of FIG. 1 showing the structural details of this feed valve portion.

FIG. 4 is a diagrammatic view of a double check valve device of special design shown in outline in FIG. 1 of the drawings.

Description

Referring to the drawings, the locomotive fluid pressure brake apparatus embodying the invention comprises a brake pipe 1 that extends from the locomotive back through each car in a train, a brake cylinder device 2, a main reservoir 3, an engineer's automatic brake device 4 for controlling the pressure in the brake pipe 1, a brake control or distributing valve device 5 connected to the brake pipe 1 and controlled by variations of pressure therein, a brake application valve device 6, a combined transfer and cut-off valve device 7, a safety control or foot valve device 8, a propulsion power cut-off switch device 9 that is effective to cut-off propulsion power to the driving motors of the locomotive, and a dynamic brake cut-out switch device 9a that is disposed in a circuit that is closed when a handle of a dynamic brake controller (not shown) is moved to a position to effect an application of the dynamic brakes and opened when this handle is moved to a position to effect a release of the dynamic brakes.

The engineer's automatic brake valve device 4 comprises a sectionalized casing 10 enclosing a chamber 11 having therein a rotary valve 12 which may be moved to various positions through the medium of a stem 13 extending exteriorly of the casing 10 from the chamber 11 and provided with an operating handle 14, an equalizing piston device 15, a sanding valve device 16, a bell ringer valve device 17, a self-lapping type independent brake valve device 18 for permitting fluid pressure brakes on the locomotive to be applied and released independently of those on the connected cars in a train, a manually operable three-position brake pipe cut-out cock 19 for selectively conditioning the brake equipment on the locomotive so that it may operate as either the leading unit or as a trailing unit in multiple-unit operation or as a dead unit which may be placed between any two cars in a train in which case the brakes on the dead unit will operate under the control of the engineer on the lead unit the same as the brakes on the cars in the train, and a feed valve device 20 that is secured to a feed valve device filling piece 21 by any suitable means (not shown), which filling piece 21 is, in turn, secured to the sectionalized casing 10 by any suitable means (not shown).

The rotary valve 12 cooperates with a rotary valve seat 22 formed on the upper side of a first casing section 23 separated from a second casing section 24 of the sectionalized casing 10 by a gasket 25 of some suitable resilient material, such as rubber, and from a cover 26 by a gasket 25a.

As shown in FIG. 1 of the drawings, there are twelve passageways opening through respective corresponding ports at the face of the rotary valve seat 22, the passageways and ports being respectively designated by the numerals 27, 28, 29, 30, 31, 32, 33, 34, 35, 36, 37 and 38.

The two ports 27 and 30 are connected, respectively, to correspondingly numbered passageways in the rotary valve seat 22 and casing section 23 of the sectionalized casing 10 which passageways are closed by the respective plugs 39 and 40.

The port 28 is connected by its correspondingly numbered passageway in the rotary valve seat 22, the sectionalized casing 10, and a pipe bracket 41, to which the sectionalized casing 10 is secured by any suitable means (not shown), to a tapped port opening at the lower face of the pipe bracket and into which is received one threaded end of a pipe 28a that is connected at its other end to a fluid pressure operated emergency relay valve device 42 of well-known construction that is operable to effect a reduction at an emergency rate of the pressure in the brake pipe 1 connected thereto by a branch pipe 1a, which emergency rate of reduction effects an emergency application of both the locomotive and car brakes.

The port 29 is connected by its correspondingly numbered passageway in the rotary valve seat 22, the sectionalized casing 10, and the pipe bracket 41 to a tapped port opening at the bottom face of the pipe bracket 41 and into which is received one threaded end of an application cylinder pipe 43. The opposite end of the application cylinder pipe 43 is connected to the distributing valve device 5 (FIG. 1B) which is a part of the usual fluid pressure brake equipment used on railway locomotives but per se forms no part of the present invention. The communication provided by the application cylinder pipe 43 between the manually operated engineer's automatic brake valve device 4 and the distributing valve device 5 provides a conduit through which fluid under pressure may be supplied from the feed valve device 20 to an application cylinder chamber 44 in the distributing valve device 5 when the operating handle 14 of the engineer's automatic brake valve device 4 is moved to an "Emergency" position.

The port 31 is connected by its correspondingly numbered passageway in the rotary valae seat 22 and the sectionalized casing 10 to an exhaust valve chamber 45 (FIG. 2) formed in the independent brake valve device 18.

The ports 32 and 33 are atmospheric exhaust ports which are connected together and to atmosphere by correspondingly numbered passageways in the casing section 23 of the sectionalized casing 10.

The port 34 is connected by its correspondingly numbered passageway in the rotary valve seat 22 and the casing section 23 of the sectionalized casing 10 to a chamber 46 formed by the cooperative relationship of the casing sections 23 and 24, which chamber 46 is connected by a passageway 47 extending through the sectionalized casing 10 and the pipe bracket 41 to a tapped port opening at the bottom face of the pipe bracket 41 and into which is received one threaded end of an equalizing reservoir pipe 48. The opposite end of the equalizing reservoir pipe 48 is connected to the brake application valve device 6 through which an equalizing reservoir 49 is charged in a manner hereinafter described in detail at a rate determined by the size of a choke 50 disposed in the passageway 47.

The port 35 is connected by its correspondingly numbered restricted passageway in the rotary valve seat 22 and the casing section 23 to the chamber 46.

The port 36 is elongated and is connected by its corresponding numbered passageway in the rotary valve seat 22 and the casing section 23 to a passageway in the casing section 23 which is the corresponding numbered passageway of the port 37. This corresponding numbered passageway of the port 37 extends through the sectionalized casing 10 and opens at the wall surface of a tapered bore 51 in a body portion 52 of the three-position brake pipe cut-out cock 19, which body portion 52 is secured to the sectionalized casing 10 by any suitable means (not shown).

The port 38 is connected by its correspondingly numbered passageway in the rotary valve seat 22, the sectionalized casing 10 and the feed valve device filling piece 21 to an outlet or delivery port of the feed valve device 20.

The chamber 11 above the rotary valve 12 is constantly supplied with fluid under pressure from the main reservoir 3 via a pipe 53 and corresponding passageway in the pipe bracket 41 and sectionalized casing 10. A first branch passageway 53a of the passageway 53 in the sectionalized casing 10 extends through the feed valve device filling piece 21 to a chamber 54 (FIG. 3) in the feed valve device 20, and a second branch passageway 53b, also in the sectionalized casing 10, extends to a supply valve chamber 55 (FIG. 2) formed in the independent brake valve device 18. A third branch passageway 53c of the passageway 53 extends through the sectionalized casing 10 to the sanding valve device 16 and bell ringer valve device 17.

The equalizing piston device 15 of the engineer's automatic brake valve device 4 has an equalizing piston 56 and a stem 57, which equalizing piston device 15 is adapted to operate a brake pipe discharge valve 58. Above the equalizing piston 56 is a chamber 59, hereinafter called the equalizing chamber, which is connected by a passageway 60 in the sectionalized casing 10 and the pipe bracket 41 to a tapped port opening at the bottom face of the pipe bracket 41 and into which is received one threaded end of an equalizing reservoir pipe 61. The opposite end of the pipe 61 is connected to the hereinbefore-mentioned equalizing reservoir 49. Beneath the equalizing piston 56 is a chamber 62 that is connected by a branch passageway 37a to the passageway 37 in the sectionalized casing 10. The brake pipe discharge valve 58 seats on an annular valve seat 63 formed on a third casing section 64 of the sectionalized casing 10 which third casing section 64 is provided with a plurality of ports 65 through which communication is established from the chamber 62 and the brake pipe 1 in a manner hereinafter made apparent to atmosphere via a chamber 66 in the sectionalized casing 10 and a large exhaust passageway 67 extending from the chamber 66 through the sectionalized casing 10 and the pipe bracket 41. A choke plug 68 having a restricted passageway 69 therein is provided as is usual for effecting a reduction in brake pipe pressure at the usual service rate upon the opening of the brake pipe discharge valve 58.

The equalizing piston 56 and the stem 57 are separately formed, the piston 56 having an integral hub 70 extending to one side thereof in which hub is a counterbore 71 provided with threads in the outer or lower portion thereof for receiving the threaded end portion of the stem 57, the stem 57 being provided with an annular flange 72 surrounding the threaded end thereof, which clamps against the lower side of a lock washer 73 interposed between the annular flange 72 and the lower face of the piston 56 when the parts are screwed together. The piston stem 57 may be provided with a hexagonal or other polygonal portion adapted to receive a wrench or other tool and contains a longitudinally extending counterbore 74 opening at the upper end thereof into the counterbore 71 in the hub 70 of the piston 56.

The hub 70 of the equalizing piston 56 has an axially extending port 75 in the end thereof establishing communication between the equalizing chamber 59 and the interior of the counterbore 71 in the hub portion 70, and the stem 57 is provided with a plurality of suitable ports 76 therein establishing communication between the counterbore 74 in the stem 57 and the chamber 62 below the equalizing piston 56. A passageway through the piston 56 and stem 57 for the flow of fluid under pressure from one side to the other side of the piston 56 is thus provided.

A disc check valve 77 for controlling the flow of fluid under pressure through the equalizing piston 56 from the equalizing chamber 59 to the chamber 62 below the piston 56 is disposed within the counterbore 71 in the hub portion 70 of the equalizing piston 56.

The disc check valve 77 is adapted to be resiliently urged or biased by a spring 78 into seated contact with an annular valve seat 79 formed on the hub 70 at the upper end of the counterbore 71 therein and surrounding the port 75. The spring 78 is interposed between the bottom of the counterbore 74 and an annular flange formed on a follower 80, the apex of which is rounded and which extends into a recess formed on the lower side of the disc check valve 77, limited universal movement of the valve 77 on the follower 80 thus being permitted for effecting proper seating of the disc check valve 77 on its annular valve seat 79.

Opening movement of the disc check valve 77 is limited by an annular rib seat or stop 81 formed on the upper end of the piston stem 57, transverse grooves or slots (not shown) being formed in the face of the annular rib seat 81 for permitting the flow of fluid under pressure past the disc check valve 77 into the counterbore 74 in the stem 57, when the lower side of the disc check valve 77 is in contact with the annular rib seat 81.

As shown in FIG. 2 of the drawings, the independent brake valve device 18 comprises a sectionalized casing having a main casing section 82, a side casing section 83, a bottom casing section 84, a top casing section 85, and a handle guard casing section 86. The side casing section 83, bottom casing section 84, and top casing section 85 are removably secured to the main casing section 82 by any suitable means (not shown). The main casing section 82 is removably secured to the sectionalized casing 10 of the engineer's automatic brake valve device 4 by any suitable means (not shown).

The main casing section 82, the side casing section 83, and the bottom casing section 84, when secured together, define a pressure chamber 87 that is opened to a chamber 88 through a bore 89 in the main casing section 82. Formed at the end of the bore 89 adjacent the chamber 88 is an annular valve seat 90 against which an annular flat disc valve 91 is normally biased by a spring 92 that is interposed between the annular flat disc valve 91 and a screw-threaded plug 93 that is screw threaded into a corresponding threaded bore formed in the main section 82. The chamber 88 is connected by a passageway 94 that extends through the main casing section 82 and the sectionalized casing 10 of the engineer's automatic brake valve device 4 to the passageway 29 (FIG. 1) in the sectionalized casing 10.

The side casing section 83 is provided with the hereinbefore-mentioned supply valve chamber 55 into which opens the branch passageway 53b that extends through the sectionalized casing 10, the main casing section 82, and the side casing section 83 so that the chamber 55 is constantly charged with fluid under pressure from the main reservoir 1. Contained in the chamber 55 is a supply valve 95 which is adapted to seat on an annular valve seat 96 formed on the side casing section 83 and which supply valve 95 is subject on one side to the pressure of a spring 97 interposed between the supply valve 95 and a screw-threaded plug 98 that has screw-threaded engagement with a corresponding screw-threaded bore formed in the side casing section 83. The supply valve 95 is operated in the manner hereinafter explained in detail, to control communication from the supply valve chamber 55 to the pressure chamber 87.

The side casing section 83 is provided with a hollow cylinder 99 formed integral therewtih and opening at one end to the chamber 87, the other end of the cylinder being closed by a screw-threaded adjusting member 100 which has screw-threaded connection with a corresponding internal screw-threaded bore in the side casing section 83. The adjusting member 100 can be locked in any adjusted position by means of a cap nut 101 that has screw-threaded engagement with the right-hand end of the adjusted member 100 and abuts right-hand side of the side casing section 83.

Operatively mounted in the cylinder 99, adjacent its open end, is a movable abutment in the form of a piston 102 having a stem 103 which is slidably guided in a bore 104 formed in the adjusting member 100. The piston 102 and adjusting member 100 cooperate with the cylinder 99 to form the hereinbefore-mentioned exhaust valve chamber 45 into which opens the passageway 31, as hereinbefore stated. As can be seen from FIG. 1 of the drawings, the rotary valve 12, when it occupies its "Running" position in which it is shown, is provided with a passageway 105 which establishes communication between the ports 31 and 33 in the valve seat 22. Since the port 33 is an atmospheric exhaust port, it will therefore be seen that the exhaust valve chamber 45 (FIG. 2) in the independent brake valve device 18 is connected to the atmosphere by the passageway and port 31, passageway 105 in the rotary valve 12, and exhaust port and passageway 33. Contained in the exhaust valve chamber 45 (FIG. 2) is a spring 106 which is interposed between the right-hand face of the piston 102 and the adjusting member 100.

Contained in a valve chamber 107 formed in the piston 102, which chamber is opened to the pressure chamber 87 through a passageway 108 in the piston 102, is an exhaust valve 109 which is adapted to seat on an annular valve seat 110 formed on the piston 102, and which is operative to control communication from the valve chamber 107 to the exhaust valve chamber 45 by way of a pair of connected passageways 111 formed in the piston stem 103. The exhaust valve 109 is provided with a stem 112 having a collar 113 which is slidably mounted in a central counter bore 114 in the piston 102 and which is subject to the pressure of a light spring 115 interposed between the collar 113 and the piston 102. Outward movement of the valve 109 relative to the piston 102 is limited by the collar 113 contracting a stop formed by the end of the counterbore 114. The stem 112 extends through a bore 116 formed in the piston 102, which bore is coaxial with the counterbore 114 therein. The stem 112 also extends beyonds the left-hand end of the piston 102 where it is adapted to be operated by an operating mechanism which will now be described.

For controlling the operation of the supply valve 95 and the exhaust 109 respectively, there is provided a mechanism comprising a pair of space levers 117, only one of which appears in FIG. 2, which are pivotally connected, intermediate their ends, as by means of a pin 118, to a plunger 119 which has one end slidably guided within a counterbore 120 formed in the side casing section 83.

At one side or above the pivot pin 118, the ends of the levers 117 are connected together through the medium of a pin 121 on which is also mounted a roller 122 which is disposed between the upper ends of the levers 117. The roller 122 is adapted to operatively contact the outer end of the exhaust valve stem 112. At the other or lower side of the pivot pin 118, the corresponding ends of the levers 117 are disposed on the opposite sides of one end of an operating rod 123 and pivotally connected thereto by means of a pin 124. The opposite end of the operating rod 123 operatively contacts one side of the supply valve 95 within a recess 125 formed in the one side of the valve.

For the purpose of controlling the operation of the plunger 119, a rotatable cam 126 is provided that contacts a cam dog 127 which is pivotally mounted by means (not shown) on the main casing section 82. This cam dog 127 is interposed between the cam 126 and the left-hand end of the plunger 119. The cam 126 is secured, as by means of a press fit, to the lower end of an operating shaft 128 which is rotatably mounted adjacent its opposite ends in the main casing section 82 and the top casing section 85 respectively.

The operating shaft 128 is provided with a counterbore 129 in which is slidably mounted an actuating plunger 130, the upper end of which is biased against an operating handle 131 by a spring 132 that is interposed between the lower end of the actuating plunger 130 and the bottom of the counterbore 129. Slidably mounted on the operating shaft 128 is a plunger collar 133 having formed integral therewith at its upper end a flange 134. A pin 135 extends through two diametrically opposite bores in the flange 134, a pair of diametrically opposite slots 136 formed in the operating shaft 128, and a bore 137 formed in the actuating plunger 130 thereby providing a connection between the plunger collar 133 and the actuating plunger 130 so that both are moved downward together upon the engineer depressing the operating handle 131 to rock it about a pin 138 having its opposite ends anchored in the handle guard casing section 86. The spring 132 is normally effective through the intermediary of the actuating plunger 130 to bias the operating handle 131 against the lower side of a flange 139 formed at the lower end of a sleeve member 140 that is secured to the operating shaft 128, as by means of a pin 141.

A headed operating arm anchor pin 142 extends through a bore 143 formed adjacent the right-hand end of a quick release valve operating arm 144 and is provided on its lower end with external screw threads for screw-threaded engagement with corresponding internal screw threads formed on the wall of a counterbore in the main casing section 82. A spring 145 is disposed in surrounding relation to the operating arm anchor pin 142 and is interposed between the main section casing 82 and the quick release valve operating arm 144 so as to yieldingly bias two arms 146, only one of which appears in FIG. 2, of a yoke formed integral with the quick release valve operating arm 144, against the lower side of the flange 134 on the plunger collar 133. The quick release valve operating arm 144 is provided with a downwardly extending finger 147 which is adapted to effect, through the intermediary of a fluted plunger 148 that is slidably mounted in a bore 149 in the main casing section 82, unseating of a flat disc type quick release valve 150 from an annular valve seat 151 formed at the right-hand end of the bore 149 against the yielding resistance of a spring 152 that is interposed between the quick release valve 150 and a screw-threaded plug 153 that has screw-threaded engagement with a screw-threaded bore formed in the main casing section 82.

The screw-threaded plug 153 and the main casing section 82 cooperate to form a chamber 154 in which the quick release valve 150 is disposed and which is connected by a passageway 155 that extends through the main casing section 82 to the hereinbefore-mentioned chamber 88 in the main casing section 82, there being a choke 156 disposed in that end of the passageway 155 that opens into the chamber 88 to control the rate of flow of fluid under pressure from the chamber 88 to the chamber 154.

The main casing section 82 and the top casing section 85 of the independent brake valve device 18 cooperate to form a chamber 157 through which the operating shaft 128 extends and which is constantly open to the atmosphere through a passageway 158 formed in the main casing section 82. That portion of the operating shaft 128 that is disposed within the chamber 157 has formed on its peripheral surface, as by machining, a cam surface 159, the contour or shape of which, as the operating shaft 128 is manually rotated by means of the operating handle 131, is effective, through a pawl 160 that is operatively mounted on the main casing section 82 by any suitable means (not shown), and a fluted plunger 161 that is slidably mounted in a bore 162 in the main casing section 82, to unseat a flat disc type release valve 163 from an annular valve seat 164 formed at the left-hand end of the bore 162 against the yielding resistance of a spring 165 that is interposed between the release valve 163 and a screw-threaded plug 166 that has screw-threaded engagement with a screw-threaded bore formed in the main casing section 82.

The screw-threaded plug 166 and the main casing section 82 cooperate to form a chamber 167 in which the release valve 163 is disposed and into which opens a branch passageway 31a of the hereinbefore-mentioned passageway 31 that is connected to the exhaust valve chamber 45.

As shown in FIG. 1 of the drawings, rotatably mounted in the tapered bore 51 formed in the body portion 52 of the three-position brake pipe cut-out cock 19 is a tapered key 168. A spring 169 is interposed between the left-hand or larger end of the tapered key 168 and a screw-threaded plug 170 that has screw-threaded engagement with corresponding internal screw threads formed on the wall of a bore in the body portion 52, the spring 169 being effective to bias the tapered key 168 into contact with the wall surface of the tapered bore 51 in the body portion 52 so that the right-hand end of the tapered key 168 extends to the exterior of the body portion 52. The right-hand end of the tapered key 168 is square in cross section and is adapted to receive thereon a handle socket 171 which is secured thereto, as by means of a pin 172. Disposed between the bottom of a recess 173 formed in the handle socket 171 and a curved end of a handle 174 is a spring 175 which is effective to bias a pin 176 carried by the handle 174 against the upper end of any one of three arcuately spaced grooves 177, only one of which appears in FIG. 1, formed as by machining, in the flat end of a boss 178 that is formed integral with the body portion 52.

The handle 174 can be rotated by the engineer from any one of its three positions to another one of its positions by him first exerting a downward pull on the handle 174, as viewed in FIG. 1 of the drawings, until the pin 176 carried by the handle 174 is below the end of the respective groove 177, then rotating the handle 174 until the pin 176 is in alignment with another one of the grooves 177 corresponding to the desired one of the three positions of the three-position brake pipe cut-out cock, and thereafter releasing his grip on the handle 174 whereupon the spring 175 is rendered effective to move the handle 174 upward, as viewed in FIG. 1, until the pin 176 carried by the handle 174 abuts the end of the respective groove 177. The pin 176 and each one of the three grooves 177 cooperate to lock the handle 174 in one of its three positions against movement therefrom by vibration or any other force that may be accidently applied to the handle 174.

Opening at the wall surface of the tapered bore 51 in the body portion 52 of the three-position cut-out cock 19, in addition to the hereinbefore-mentioned passageway 37, are four other passageways 179, 180, 181 and 182.

The passageway 179 opens at the wall surface of the tapered bore 51 at a point diametrically opposite the point at which the passageway 37 opens at this wall surface so that while the tapered key 168 occupies the position in which it is shown in FIG. 1 of the drawings, hereinafter referred to as its "Lead" position, a communication is established between the passageway 37 and the passageway 179 via a passageway 183 in the tapered key 168 which passageway 179 extends through the body portion 52, the sectionalized casing 10 and the pipe bracket 41 to a tapped port opening at the bottom face of the pipe bracket 41 into which is received one threaded end of a pipe 184. The opposite end of the pipe 184 is connected to the side outlet of a pipe T 185 disposed in the brake pipe 1.

The passageway 180 opens at the wall surface of the tapered bore 51 at a point diametrically opposite the point at which the passageway 181 opens at this wall surface so that while the tapered key 168 occupies its "Lead" position in which it is shown in FIG. 1, the end of the passageway 180 opening at the wall surface of the tapered bore 51 is cut off or blanked by the tapered key 168, and the passageway 181, which is open at one end to atmosphere, is connected at its other end, which opens at the wall surface of the tapered bore 51, via a passageway 186 formed in the tapered key 168, to that end of the passageway 182 that opens at the wall surface of the tapered bore 51.

The passageway 180 extends through the body portion 52, the sectionalized casing 10 and the pipe bracket 41 to a tapped port opening at the bottom face of the pipe bracket 41 into which is received one threaded end of a pipe 187. The opposite end of the pipe 187 is connected to the side outlet of a pipe T 188 disposed in the pipe 53, one end of which pipe 53 is connected to the main reservoir 3, and the other end of which is connected to the corresponding passageway 53 in the sectionalized casing 10 of the engineer's automatic brake valve device 4.

The passageway 182 also extends through the body portion 52, the sectionalized casing 10 and the pipe bracket 41 to a tapped port opening at the bottom face of the pipe bracket 41 into which is received one threaded end of a pipe 189. The opposite end of the pipe 189 is connected to one end of a pipe T 190, the other end and side outlet of which are connected to certain other devices comprising the locomotive brake equipment of the present invention, as hereinafter described.

As shown in FIG. 3 of the drawings, the feed valve device 20 comprises a supply portion 191 which operates to supply fluid under pressure from the main reservoir 3 by way of the pipe and corresponding passageway 53 and branch passageway 53a to the brake pipe 1 by way of the engineer's automatic brake valve device 4, in a manner hereinafter described in detail, and a regulating portion 192 which controls the operation of the supply portion 191 and the pressure of the fluid thus supplied to the brake pipe 1.

The supply portion 191 comprises a piston 193 having at one side a control chamber 194 which is in open communication by way of a passageway 195 with the regulating portion 192, and at the other side the hereinbefore-mentioned chamber 54 which is supplied with fluid under pressure from the main reservoir 3 via the branch passageway 53a and passageway and corresponding pipe 53. A restricted passageway 196 through the piston 193 establishes a communication between the chamber 54 and the control chamber 194. Contained in the chamber 54 and mounted on a stem 197 integral with the piston 193 for movement therewith is a valve 198, which valve controls communication between the chamber 54 and a delivery chamber 199, the latter chamber being open by way of a passageway 200 to a chamber 201 in the regulating portion 192 and, while the handle 14 of the engineer's automatic brake valve device 4 is in "Running" position as shown in FIG. 1, with the brake pipe 1 by way of the hereinbefore-mentioned passageway 38 in the sectionalized casing 10, which passageway extends through the feed valve device filling piece 21 and opens into the delivery chamber 199, the corresponding port 38 in the valve seat 22 (FIG. 1), a cavity 202 formed in the lower face of the rotary valve 12, the port and corresponding passageway 37 extending through the sectionalized casing 10 and body portion 52 of the three-position brake pipe cut-out cock 19, the passageway 183 in the tapered key 168, the passageway 179, and the pipe 184 which is connected to the side outlet of the pipe T 185 that is disposed in the brake pipe 1.

Interposed between an annular spring seat 203 (FIG. 3) that surrounds the stem 197 just beneath the valve 198 and a strainer 204 operatively mounted on a piston stem guide 205 is a spring 206 which constantly urges the valve 198 toward its seated position on an annular valve seat 207 in which position it is shown in FIG. 3.

For controlling the pressure of fluid in the control chamber 194, the regulating portion 192 is provided with a flexible diaphragm 208 preferably of the bellows type and subject on one side to the force of an adjustable regulating spring 209. At the opposite side of the bellows 208 is a chamber 210 that is connected by a passageway 211 that extends through the feed valve device 20 and the feed valve device filling piece 21 (FIG. 1) to a tapped port opening at the bottom face of the filling piece 21 and into which is received one threaded end of a pipe 212. The opposite end of the pipe 212 is connected to the side outlet of a double check valve device 213. One end of the double check valve device 213 is connected by a pipe 214 to a tapped port opening at the right-hand side of the pipe bracket 41. This tapped port is connected to the hereinbefore-mentioned passageway 179 in the sectionalized casing 10 of the engineer's automatic brake valve device 4 by a branch passageway 179a extending through the pipe bracket 41 and the sectionalized casing 10. Since the passageway 179 is connected via the pipe 184 and pipe T 185 to the brake pipe 1, fluid under pressure normally flows from the brake pipe 1 to the chamber 210 (FIG. 3) through the side outlet of the pipe T 185, pipe 184, passageway 179, branch passageway 179a, pipe 214, double check valve 213, pipe 212 and passageway 211 so that operation of the feed valve device 20 is controlled in accordance with variations in pressure in the brake pipe 1.

A chamber 215, which is connected by way of the passageway 195 to the control chamber 194 in the supply portion 191, is also connected to the chamber 201 through a bore provided in a valve seat member 216, there being an annular valve seat 217 formed at the lower end of the bore, against which annular valve seat a regulating valve 218 disposed in the chamber 215 is biased by a spring 219 interposed between the regulating valve 218 and a bottom cover member 220 of the feed valve device 20. A stem 221 is interposed between the top of the regulating valve 218 and the bottom of the bellows 208 and is effective to unseat the regulating valve 218 against the yielding resistance of spring 219 upon the force of the regulating spring 209 exceeding brake pipe pressure in the chamber 210 and acting on the bellows 208.

The brake control valve device 5 is a standard distributing valve device manufactured by Westinghouse Air Brake Company, the structure and operation of which distributing valve is well known in the railway braking art. Upon the supply of fluid under pressure to the application piston cylinder chamber 44 of the brake control valve device 5, in response to either a reduction in pressure in the brake pipe 1, movement of the handle 14 of the engineer's automatic brake valve device 4 to its "Emergency" position, or the manual operation of the independent brake valve device 18, the brake control valve device 5 operates to effect the supply of fluid under pressure from the main reservoir 3 to the brake cylinder device 2 to cause an application of the brakes on the locomotive. The distributing valve device 5 operates upon a release of fluid under pressure from the application piston cylinder chamber 44 to effect a release of fluid under pressure from the brake cylinder device 2 to cause a release of the brakes on the locomotive.

The brake application valve device 6 (FIG. 1A) comprises a sectionalized casing containing an application valve 222, a suppression valve 223, a release control valve 224 and a check valve device 225.

The application valve 222 is of the spool type and is reciprocable in a bore 226 formed in the sectionalized casing of the brake application device 6. A chamber 227 is formed at the lower end of the application valve 222 by its cooperative relationship with the wall of the bore 226. The opposite end of the application valve 222 is connected to a flexible diaphragm 228 which is subject on its lower side to fluid under pressure in a chamber 229 that is constantly opened to the main reservoir 3 via a passageway and corresponding pipe 230 which is connected to the side outlet of a pipe T 231 disposed in the pipe 53 which is connected to the main reservoir 3, as hereinbefore described. The diaphragm 228 is subject at its upper side to the force of a heavy bias spring 232 and fluid under pressure in a chamber 233 that is constantly opened via a passageway 234, a choke 235, and a branch passageway 230a to the passageway 230 that is connected to the main reservoir 3, as explained above.

Intermediate its ends, the spool type application valve 222 has three spaced-apart peripheral annular grooves 236, 237 and 238 which are sealingly separated one from the other by O-ring seals 239, there being two of these O-ring seals adjacent each end of the peripheral annular groove 238. The spring 232 is of such force as to maintain the application valve 222 in a normal position, in which it is shown in FIG. 1A, so long as pressure in the chamber 229 does not exceed the pressure in the chamber 233 by more than a preselected degree, such as, for example, 35 pounds per square inch.

While the brake application valve 222 occupies its normal position, in which it is shown in FIG. 1A, the peripheral annular groove 236 thereon connects a passageway and corresponding pipe 240 that is connected to the other or lower end of the double check valve device 213 to an atmospheric vent passageway and corresponding port 241. The pipe 240 has disposed therein a pipe T 242 (FIG. 1), the side outlet of which is connected by a pipe 240a to one end of a double check valve device 243, the side outlet of which double check valve device is connected by a pipe 244 to one end of a pipe T 245, the other end of which is connected by a pipe 246 to the propulsion power cut-off switch device 9.

The side outlet of the pipe T 245 is connected by a pipe 247 to the dynamic brake cut-out switch device 9a. Therefore, while the application valve 222 occupies the position in which it is shown in FIG. 1A, and the tapered key 168 of the three-position brake pipe cut-out cock 19 occupies the position in which it is shown in FIG. 1, fluid under pressure is vented from the propulsion power cut-off switch device 9 and the dynamic brake cut-off switch device 92.

Also, while the application valve 222 occupies the position in which it is shown in FIG. 1A, the peripheral annular groove 237 thereon connects one end of a passageway 248 in the sectionalized casing of the brake application valve device 6 to the atmospheric vent passageway and port 241. The other end of the passageway 248 is open to atmosphere and intermediate its ends the passageway 248 has opening thereinto one end of a passageway 249 having therein a choke 250. The opposite end of the passageway 249 opens at the wall surface of the bore 226 in the sectionalized casing of the brake application valve device 6 below the location at which the one end of the passageway 248 opens at the wall surface of the bore 226.

The peripheral annular groove 238 connects a passageway 251 in the sectionalized casing of the brake application valve device 6, which passageway 251 is connected by a pipe bearing the same numeral to one end of a pipe T 252 disposed in the pipe 61 between the engineer's automatic brake valve device 4 and the equalizing reservoir 49, to one end of a passageway 253 in the sectionalized casing of the brake application valve device 6, the opposite end of which passageway 253 is connected by a peripheral annular groove 254 formed on the release control valve 224, which is also of the spool type, to a passageway 255 in the sectionalized casing of the brake application valve device 6 to which passageway 255 the hereinbefore-mentioned equalizing reservoir pipe 48 is connected. The peripheral annular groove 238 also connects, while the application valve 222 occupies the position in which it is shown in FIG. 1A, the passageway 251 in the sectionalized casing of the brake application valve device 6 to a passageway 256 also in this sectionalized casing, which passageway 256 leads to the inner seated area of the hereinbefore-mentioned check valve device 225 that is disposed in a chamber 257 and biased against an annular valve seat 258 by a spring 259. The chamber 257 has opening thereinto one end of a branch passageway 255a, the opposite end of which is connected to the passageway 255.

The hereinbefore-mentioned passageway 230 in the sectionalized casing of the brake application valve device 6 has a branch passageway 230b that opens at the wall surface of the bore 226. This end of the branch passageway 230b is closed or lapped by the application valve 222 while it occupies its normal position in which it is shown in FIG. 1A.

The passageway 234 in the sectionalized casing of the brake application valve device 6 has therein two branch passageways 234a and 234b. The branch passageway 234a is connected by a pipe bearing the same numeral to a volume reservoir 260 and has a third branch passageway 234c that opens at the wall surface of the bore 226 in the sectionalized casing of the brake application valve device 6 at a point spaced above the location at which a passageway and corresponding pipe 261 open at the surface of this bore. The pipe 261 is connected to a manually operated on-off valve device 262, which will hereinafter be described in detail.

The branch passageway 234b extends through the sectionalized casing of the brake application valve device 6 and opens at the surface of a bottom bore 263 therein adjacent the lower end thereof.

The hereinbefore-mentioned suppression valve 223 is slidably mounted within the bottom bore 263 and has formed integral therewith at its upper end a piston 264 that is slidably mounted in a coaxial counterbore 265 formed in the sectionalized casing of the brake application valve device 6. The piston 264 is subject on its lower side to the force of a spring 266 which is disposed in an annular atmospheric chamber 267 and interposed between the lower side of the piston and an annular spring seat 268, which spring 266 is effective to bias the upper side of the piston 264 into contact with a stop formed by a cover member 269 of the brake application valve device 6.

Opening at the wall surface of the bottom bore 263 in the sectionalized casing of the brake application valve device 6 at a point located just above the point at which the branch passageway 234b opens into this bottom bore and below the lower end of the suppression valve 223 when this valve is biased by the spring 266 to its upper position in which it is shown in FIG. 1A of the drawings, is one end of a passageway 270 that is connected by a pipe bearing the same numeral to the hereinbefore-mentioned safety control or foot valve device 8 (FIG. 1B), there being a cut-out cock with seal 271 disposed in the pipe 270 adjacent the foot valve device 8. Consequently, fluid under pressure that flows from the main reservoir 3 through the pipe 53, pipe T 231, pipe and passageway 230, branch passageway 230a, choke 235, passageway 234, and branch passageway 234b to the interior of the bottom bore 263, flows therefrom to the foot valve device 8 via the passageway and corresponding pipe 270 which is connected to the foot valve device 8 while the cut-out cock with seal 271 is in its open position.

The foot valve device 8 is preferably of the type comprising valve means (not shown) controlled by a pedal 272 that is normally spring biased to a first or elevated position in which it is shown in FIG. 1B for connecting one end of the pipe 270 to a pipe 273 leading to a whistle 274, which pipe 273 has disposed therein in series a restriction or choke 275 and a pipe T 276, the side outlet of which is provided with a vent choke (not shown). Therefore, the pedal 272 must be maintained depressed by the engineer against a spring bias to a second position, shown as a dotted line in FIG. 1B of the drawings and indicated by the numeral 277, in order to close communication between pipes 270 and 273 to thus prevent venting of pipe 270 to atmosphere via the whistle 274.

While the suppression valve 223 of the brake application valve device 6 occupies its normal position in which it is shown in FIG. 1A of the drawings, a peripheral annular groove 278 formed on the suppression valve 223 connects a passageway 279 in the sectionalized casing of the brake application valve device 6 and a corresponding pipe which is connected to the side outlet of a double check valve device 280, to a counterbore 281 formed in the suppression valve 223, this counterbore being open adjacent one end to the peripheral annular groove 278 by a cross-drilled passageway 281a, and being opened at its opposite end to a chamber 282 at the upper side of the piston 264.

One end of the double check valve device 280 is connected by a pipe 283 to the side outlet of a pipe T 284 (FIG. 1B), one end of which is connected by a pipe 285 to the hereinbefore-mentioned brake cylinder device 2. The opposite end of the pipe T 284 is connected by a pipe 286 to one end of a pipe T 287, the other end of which is connected to the usual brake cylinder pipe and corresponding passageway in the distributing valve device 5. The side outlet of the pipe T 287 is connected to the combined transfer and cut-off valve device 7, as hereinafter described.

Disposed in the pipe 53 is a pipe T 288 (FIG. 1A), the side outlet of which is connected by a pipe 289 to a passageway bearing the same numeral in the sectionalized casing of the brake application valve device 6, which passageway leads to a chamber 290 above the hereinbefore-mentioned release control valve 224. Since the pipe 53 is connected to the main reservoir 3, fluid under pressure at main reservoir pressure will flow from the main reservoir 3 via pipe 53, pipe T 288, and pipe and passageway 289 to the chamber 290 above release control valve 224 in the brake application valve device 6 to maintain it in the position shown in FIG. 1A.

The hereinbefore-mentioned passageway 255 in the sectionalized casing of the brake application valve device 6 opens at the wall surface of a counterbore 291 formed in the sectionalized casing of the brake application valve device 6, in which counterbore the release control valve 224 is slidably mounted. The lower end of the counterbore 291 is connected by a passageway 292 in the sectionalized casing of the brake application valve device 6 to the lower end of the bore 226 which is normally vented to atmosphere via the passageway and corresponding pipe 261 and the manually operated on-off valve device 262, hereinafter described in detail.

The hereinbefore-mentioned combined transfer and cut-off valve device 7, shown in FIG. 1A of the drawings, comprises a pipe bracket 293 that is provided on opposite sides with vertical bolting faces 294 and 295 to which are secured, respectively, by any suitable means a transfer valve device 296 and a cut-off valve device 297.

Extending from the vertical bolting face 294 of the pipe bracket 293 through the bracket and opening at a flat surface 298 on the lower side of the bracket and at right angles to the bolting faces 294 and 295 are three ports and corresponding passageways 299, 300 and 301. Extending through the pipe bracket 293 and opening respectively at the vertical bolting faces 294 and 295 is a passageway 302.

The port and corresponding passageway 299 is connected by a pipe bearing the same numeral to the side outlet of a pipe T 303, one end of which is connected by a pipe 304 to that end of the hereinbefore-mentioned pipe T 190 opposite the end to which the pipe 189 is connected. The opposite end of the pipe T 303 is connected by a pipe 305 to that end of the hereinbefore-mentioned double check valve device 280 opposite the end to which the pipe 283 is connected.

The port and passageway 300 in the pipe bracket 293 is connected by a pipe bearing the same numeral to the side outlet of the hereinbefore-mentioned pipe T 287 (FIG. 1B).

The port and passageway 301 in the pipe bracket 293 is connected by a pipe bearing the same numeral to the side outlet of a pipe T 306 that is disposed in the hereinbefore-mentioned application cylinder pipe 43 extending between the engineer's automatic brake valve device 4 and the distributing valve device 5.

The transfer valve device 296 comprises a casing section 307 containing a diagram 308 clamped about its periphery between the casing section 307 and a cover 309, and cooperating with the cover to form above the diaphragm a control chamber 310. At the other or lower side of the diaphragm 308 is a spring chamber 311 which is open to atmosphere through a passageway 312 formed in the casing section 307. Contained in the chamber 311 is a diaphragm follower 313 which is biased into operative contact with the diaphragm 308 by a spring 314 interposed between the diaphragm follower 313 and the bottom of a counterbore 315 formed in the casing section 307. Diaphragm follower 313 has a stem 316 that extends through a bore 317 that is coaxial with the counterbore 315 and connects the spring chamber 311 with a chamber 318 formed in the casing section 307, in which chamber 318 is a valve 319 that is linked by means of a forked connection 320 to the lower end of follower stem 316, as shown in FIG. 1A of the drawings. The valve 319 is adapted to make seating contact with a valve seat 321 formed on the upper end of a cylindrical valve member 322 which is slidably mounted in a bore 323 formed in a casing section 324 which is secured to the casing section 307 by any suitable means (not shown). The bore 323 in the casing section 324 extends from the chamber 318 to a chamber 325 formed in another casing section 326 secured to the casing section 324 by any suitable means (not shown).

The valve member 322 is provided with a through bore 327 and a coaxial counterbore 328 encircled at its upper end by the valve seat 321. The lower end of the cylindrical valve member 322 is encircled by a conical or poppet-type valve 329, which valve is arranged for cooperation with an annular valve seat 330 formed on the casing section 324 at the lower end of the bore 323, to control communication between chamber 325 and a chamber 331 defined by the wall surface of the bore 323 and a reduced portion of the cylindrical valve member 322. A spring 332 is disposed in chamber 325 and is interposed between the valve 329 and the casing section 326 for urging the cylindrical valve member 322 upwardly to a position in which communication between chambers 318 and 325 is opened via bore 327 and counterbore 328, and communication between chamber 325 and chamber 331 is closed, as shown in FIG. 1A of the drawings.

The casing section 307 of the transfer valve device 296 is provided on one side thereof with a vertical bolting face 333 that corresponds to the bolting face 294 of the pipe bracket 293, in that opening at the surface of the bolting face 333 are the same number of ports as open at the surface of the bolting face 294, these ports being identically arranged therein and opening from corresponding passageways in the body of casing section 307 so that when a gasket 334 provided with a port therein is placed around each of the ports opening at the respective surfaces of bolting faces 294 and 333, and between these bolting faces and the casing section 307 is rigidly secured to the pipe bracket 293 by bolts or other suitable means (not shown), the passageways 299, 300, 301 and 302 in the pipe bracket 293 extend into corresponding passageways in the casing section 307.

The passageway 299 extends through the casing section 307 and cover 309 to the control chamber 310 above the diaphragm 308. The passageways 300, 301 and 302 extend, respectively, through the casing sections 307, 324 and 326 to the respective chambers 318, 331 and 325 formed by the cooperative relationship of these casing sections.

The cut-off valve device 297 comprises a diaphragm 335 clamped around its outer edge between a casing section 336 and a cover 337 which cooperates with the diaphragm 335 to form a chamber 338 above the diaphragm. The chamber 338 is open to a passageway 339 in the casing section 336, which passageway opens at the surface of a vertical bolting face 340 formed on the casing section 336 and corresponding to the vertical bolting face 295 of the pipe bracket 293, in that opening at the surface of the bolting face 340 are the same number of ports as open as the surface of the bolting face 295, these ports being identically arranged therein and opening from corresponding passageways in the body of casing section 336 so that when one of the hereinbefore-mentioned gaskets 334 is placed in surrounding relation to each one of the ports opening at the respective surfaces of bolting faces 340 and 295, and between these bolting faces and the casing section 336 is rigidly secured to the pipe bracket 293 by bolts or other suitable means (not shown), the hereinbefore-mentioned passageway 302 and a passageway 341 in the pipe bracket 293 extending into corresponding passageways in the casing section 336. Likewise, the passageway 339 in the casing section 336 extends into a corresponding passageway in the pipe bracket 293, which passageway is connected by a pipe bearing the same numeral to the side outlet of a pipe T 342, one end of which is connected by a pipe 343 to one end of a second pipe T 344 disposed in the hereinbefore-mentioned pipe 53, the side outlet of the pipe T 344 being connected to the main reservoir 3 and the opposite end of this pipe T being connected to the engineer's automatic brake valve device 4. Therefore, fluid under pressure from the main reservoir 3 flows to the chamber 338 in the cut-off valve device 297 via pipe 53, pipe T's 231, 288 and 344, pipe 343, pipe T 342 and pipe and passageway 339 so that the chamber 338 is normally charged with fluid under pressure from the main reservoir 3.

Located below the diaphragm 335 is a spring chamber 345 which is open to atmosphere through a passageway 346 formed in the casing section 336. Contained in the chamber 345 is a diaphragm follower 347 which is biased into operative contact with the diaphragm 335 by a spring 348 interposed between the diaphragm follower 347 and the bottom of a counterbore 349 formed in the casing section 336. Diaphragm follower 347 has a stem 350 that extends through the chamber 345 and a bore 351 formed in the casing section 336 and coaxial with the counterbore 349 therein, into a chamber 352 formed by the cooperative relationship of the casing section 336 and a casing section 353 secured thereto by any suitable means (not shown). The casing section 353 is provided with a bore 354 that connects the chamber 352 to a chamber 355 formed by the cooperative relationship of the casing section 353 and a cover member 356 which is secured to the lower end of the casing section 353 by any suitable means (not shown). Formed at the lower end of the bore 354 is an annular valve seat 357 and slidably mounted in the bore 354 is a fluted stem 358, the lower end of which is encircled by a conical or poppet-type valve 359 which is arranged for cooperation with the annular valve seat 357 to control communication between the chambers 352 and 355. A spring 360 is disposed in the chamber 355 and is interposed between the valve 359 and the cover member 356 for urging the valve 359 upwardly into seating contact with the annular valve seat 357 to close communication between chambers 352 and 355. The length of the fluted stem 358 is such that, while the valve 359 is seated on the annular valve seat 357, the upper end of the stem 358 abuts the lower end of the stem 350 of the diaphragm follower 347. Therefore, when fluid under pressure from the main reservoir 3 is present in the chamber 338 above the diaphragm 335, the diaphragm 335 will be deflected downward to, through the intermediary of the diaphragm follower 347 and its stem 350 and the fluted stem 358, effect unseating of the valve 359 from its corresponding annular valve seat 357 and thereby open communication between the chambers 352 and 355.

The hereinbefore-mentioned passageways 302 and 341, which extend through the pipe bracket 293 and open at the vertical bolting face 295 thereof, register with corresponding ports opening at the surface of the vertical bolting face 340 of the casing section 336, which ports are respectively connected by corresponding passageways in the casing sections 336 and 353 to the chambers 352 and 355.

The passageway 341 that extends through the casing section 336 and the pipe bracket 293 is connected by a pipe bearing the same numeral to the side outlet of a pipe T 361 that is disposed in a brake cylinder equalizing pipe 362 that extends from end to end of the locomotive and is adapted to be connected to a corresponding brake cylinder equalizing pipe on another locomotive when the two locomotives are operating in multiple-unit operation.

The side outlet of the hereinbefore-mentioned pipe T 190 (FIG. 1) is connected by a pipe 363 to one end of a novel double check valve device 364 which per se is not applicant's invention.

The double check valve 364 is shown diagrammatically in FIG. 4 of the drawings and, briefly, comprises a body 365 having a bore 366 extending therethrough and two cover members 367 and 368 secured, respectively, to the opposite ends of the body 365 by any suitable means (not shown), there being a gasket 369 having a port therein disposed between each of the cover members and the corresponding end of the body 365. The cover member 367 is provided with a chamber 370 open to one end of the bore 366 and into which chamber opens a passageway in the cover member to which passageway the pipe 363 (FIG. 1) is connected. Likewise, the cover member 368 is provided with a chamber 371 open to the opposite end of the bore 366 and into which chamber opens a passageway 372 in the cover member, which passageway is connected by a pipe bearing the same numeral to the outlet end of a check valve device 373 (FIG. 1), the inlet end of which is connected by a pipe 374 to the side outlet of a pipe T 375 disposed in the hereinbefore-mentioned application cylinder pipe 43 that extends between the engineer's automatic brake valve device 4 (FIG. 1) and the distributing valve device 5 (FIG. 1B).

Slidably mounted in the bore 366 are two identical but oppositely arranged cup-shaped spool type valves 376 and 377 that have interposed therebetween a spring 378 that is effective to normally bias them in opposite directions, respectively, into contact with the corresponding gasket 369 at the respective end of the bore 366. Each of the spool type valves 376 and 377 is provided with two spaced-apart peripheral annular grooves 379 and 380. In order to provide a seal with the wall surface of bore 366, adjacent each end of each of the two spaced apart peripheral annular grooves 379 and 380, each of the spool type valves 376 and 377 is provided with three peripheral annular grooves in each of which is carried an O-ring seal 381.

As shown in FIG. 4 of the drawings, the body 365 of the double check valve device 364 is provided with five passageways 382, 383, 384, 385 and 386, and an atmospheric exhaust passageway 387 which is connected to the passageway 385 intermediate the ends thereof.

The passageway 382 opens at one end into the chamber 371 and at the other end at the wall surface of the bore 366 at a location that is intermediate the ends of the peripheral annular groove 379 on the spool type valve 376 while this valve occupies the position in which it is shown in FIG. 4 of the drawings.

The passageway 383 opens at one end at the wall surface of the bore 366 at a location that is intermediate the ends of the peripheral annular groove 380 on the spool type valve 377 while this valve occupies the position in which it is shown in FIG. 4. The other end of the passageway 383 is connected by a pipe bearing the same numeral to that end of the hereinbefore-mentioned double check valve device 243 (FIG. 1) that is opposite the end to which the pipe 240a is connected.

The passageway 384 (FIG. 4) opens at one end at the wall surface of the bore 366 at a location that is intermediate the ends of the peripheral annular groove 380 on the spool type valve 377 and just below the location at which the one end of the passageway 383 opens at the wall surface of this bore so that while the spool type valve 377 occupies its upper position in which it is shown in FIG. 4, the peripheral annular groove 380 thereon establishes a communication between the pipe and corresponding passageway 383 and the one end of the passageway 384.

The other end of the passageway 384 opens at the wall surface of the bore 366 at a location that is intermediate the ends of the peripheral annular groove 380 on the spool type valve 376 while this valve occupies its lower position in which it is shown in FIG. 4.

Opening at the wall surface of the bore 366 just above the location at which the above-mentioned other end of the passageway 384 opens at the wall surface of this bore, and also intermediate the ends of the peripheral annular groove 380 on the spool type valve 376 while it occupies the position shown in FIG. 4 is one end of the passageway 385 so that while the spool type valve 376 occupies its lower position, the peripheral annular groove 380 thereon establishes a communication between the passageway 384 and the one end of the passageway 385, the other end of which opens at the wall surface of the bore 366 at a location substantially midway between the adjacent ends of the two spool type valves 376 and 377 while they occupy the position in which they are shown in FIG. 4. Consequently, while the two spool type valves 376 and 377 occupy the position in which they are shown in FIG. 4, the pipe and corresponding passageway 383 is connected to atmosphere via the peripheral annular groove 380 on the spool type valve 377, the passageway 384, the peripheral annular groove 380 on the spool type valve 376, the passageway 385, and the atmospheric exhaust passageway 387. Also, the interior of the bore 366 is open to atmosphere via passageway 385 and the atmospheric exhaust passageway 387.

The passageway 386 opens at one end into the chamber 370 and at the other end at the wall surface of the bore 366 at a location that is adjacent the lower end of the peripheral annular groove 379 on the spool type valve 377 while this valve occupies its upper position in which it is shown in FIG. 4.

Briefly, the hereinbefore-mentioned manually operated on-off valve device 262 (FIG. 1A) comprises a body 388 having therein a chamber 389 into which one end of the hereinbefore-mentioned pipe 261 opens. The chamber 389 is normally opened to atmosphere through a plurality of radial ports 390 that open from the periphery of a bushing 391 press-fitted into a bore in the body 388 into a counterbore 392 in the bushing 391, and a hollow plunger 393 that is slidably mounted in a bore in a second bushing 394 coaxial with the bushing 391 and press-fitted into a bore in the body 388.

The chamber 389 can be cut off from atmosphere by manually depressing a push button 395 to effect counterclockwise rocking of a pivoted lever 396 against which the upper end of the hollow plunger 393 is biased by a spring 397 that surrounds the hollow plunger and is interposed between a collar 398 formed on the hollow plunger 393 and a shoulder 399 formed by the bottom of the counterbore 392. As the lever 396 is thus rocked counterclockwise, the hollow plunger 393 is moved downward against the bias of the spring 397 until the lower end of the hollow plunger contacts a rubber covered flat disc valve 400 that is normally biased into contact with an annular valve seat 401 formed on the lower end of the bushing 391 by a spring 402 that is interposed between the flat disc valve 400 and the bottom of a chamber 403 formed in the body 388. Further downward movement of the hollow plunger 393 effects the unseating of the flat disc valve 400 against the yielding resistance of the spring 402 to establish communication between chambers 389 and 403, but by reason of the fact that the lower end of the hollow plunger 393 now is in contact with the upper side of the rubber covered flat disc valve 400, fluid under pressure cannot escape from the chamber 403 to atmosphere, which chamber 403 is closed by a screw-threaded plug 404.

*Operation*

Assume initially that the brake equipment shown in FIGS. 1, 1A and 1B of the drawings is the equipment on the leading unit of a multi-unit locomotive; that the apparatus is void of fluid under pressure; that handle 14 of the engineer's automatic brake valve device 4 (FIG. 1) is in "Running" position, and that the feed valve device 20 of the engineer's automatic brake valve device 4 has been adjusted to provide via pipe 184 a desired (such as 70 pounds per square inch) normal charge value in the brake pipe 1; that the tapered key 168 of the three-position brake pipe cut-out cock 19 is in the position in which it is shown in FIG. 1 of the drawings in which position it conditions the brake equipment shown in FIGS. 1, 1A and 1B for lead unit operation; that the application valve 222 and the suppression valve 223 of the brake application valve device 6 are in their normal position, as shown in FIG. 1A; that the pedal 272 of the safety control or foot valve device 8 (FIG. 1B) is spring biased to an elevated position, and that the push button 395 and the lever 396 of the manually operated on-off valve device 262 are in the elevated position, as shown in FIG. 1A of the drawing. Under these conditions, the various components of the apparatus will be in the respective positions in which they are shown in FIGS. 1, 1A and 1B of the drawings.

To initially charge the apparatus, the diesel engines of the locomotive are started for operating fluid compressors (not shown) to effect charging of the main reservoir 3. Pedal 272 (FIG. 1B) of the foot valve device 8 (FIG. 1B) must be depressed by the engineer to effect operation of the foot valve device 8 to a position in which communication is closed between the pipe 270 and the pipe 273 to prevent a safety control brake application, it being assumed that the cut-out cock with seal 271 is in its open position. With the pipe 270 thus cut off from the pipe 273, the brake apparatus will be charged in the following manner.

Fluid under pressure will be supplied from the main reservoir 3 via pipe 53, pipe T 231 and pipe and passageway 230 to the chamber 229 at the lower side of the diaphragm 228 that is operatively connected to the application valve 222 of the brake application valve device 6 at a substantially unrestricted rate, and will also be supplied via the branch passageway 230a, the choke 235, and the passageway 234 to the chamber 233 at the upper side of the diaphragm 228 at a restricted rate controlled by the size of the choke 235. However, the choke 235 is of such flow capacity that despite a more rapid charging of the chamber 229, application valve 222 will remain in its normal position, in which it is shown, during initial charging because the pressure in chamber 229 will not exceed the pressure in the chamber 233 by an amount sufficient to overcome the heavy bias of the spring 232 disposed in the chamber 233 and subjecting the upper side of the diaphragm 228 to the force thereof, and because the lower end of the bore 226 in which the application valve 222 is slidably mounted will be now vented to atmosphere via the passageway and pipe 261 and the manually operated on-off valve device 262.

The fluid under pressure supplied to the passageway 234, as explained above, will, in addition to flowing to the chamber 233, also flow via the branch passageway and corresponding pipe 234a to the volume reservoir 260 for charging this reservoir.

The fluid under pressure supplied from the main reservoir 3 through the choke 235 to the passageway 234 also flows therefrom via the branch passageway 234b and the counterbore 263 in which the suppression valve 223 of the brake application valve device 6 is slidably mounted, while the suppression valve 223 occupies the position in which it is shown in FIG. 1A, to the passageway and corresponding pipe 270, which pipe is connected to the foot valve device 8 (FIG. 1B), pedal 272 of which is now held depressed by the engineer to prevent flow of fluid under pressure to atmosphere via the pipe 273 and whistle 274.

Fluid under pressure will also flow from the main reservoir 3 to the chamber 54 (FIG. 3) of the feed valve device 20 of the engineer's automatic brake valve device 4 (FIG. 1) via pipe 53 and corresponding passageway in the pipe bracket 41 and sectionalized casing 10 of the engineer's automatic brake valve device 4 and the branch passage 53a that extends through the sectionalized casing 10 of the engineer's automatic brake valve device 4 (FIG. 1) and the feed valve device filling piece 21. The feed valve device 20 (FIG. 3) will operate in response to the supply of fluid under pressure thereto from the main reservoir 3 to supply fluid under pressure from the branch passageway 53a to the passageway 38 (FIG. 1) that extends through the feed valve device filling piece 21 and the sectionalized casing 10 to the valve seat 22 of the engineer's automatic brake valve device 4. As has been assumed, the handle 14 of the engineer's automatic brake valve device is in its "Running" position. Therefore, while the handle 14 is in its "Running" position, the rotary valve 12 will occupy the position in which it is shown in FIG. 1 of the drawings so that the cavity 202 in the rotary valve 12 connects the passageway and corresponding port 38 to the port and corresponding passageway 37, which passageway 37 is connected via passageway 183 in the tapered key 168 of the three-positioned brake pipe cut-out cock 19, the passageway 179, pipe 184 and pipe T 185 to the brake pipe 1. Consequently, the brake pipe 1 will be charged to the setting of the feed valve device 20.

Fluid under pressure supplied to the passageway 37 in the manner described above flows therefrom via passageway and port 36, a cavity 405 formed in the lower face of the rotary 12, port and passageway 34, chamber 46, passageway 47, choke 50, pipe 48, passageway 255 in the brake application valve device (FIG. 1A), peripheral annular groove 254 on the release control valve device 224, passageway 253, peripheral annular groove 238 on the application valve 222, passageway and corresponding pipe 251, pipe T 252 and pipe 61 to the equalizing reservoir 49 to effect charging thereof to the pressure for which the feed valve device 20 of the engineer's automatic brake valve device 4 is set.

It will be noted from FIG. 1 that the passageway 37 in the sectionalized casing 10 of the engineer's automatic brake valve device 4 is connected by branch passageway 37a to the chamber 62 below the piston 56 of the equalizing piston device 15 and that the side outlet of the pipe T 252 is connected to the pipe 61 which, in turn, is connected via passageway 60 in the sectionalized casing 10 of the engineer's automatic brake valve device 4 to the chamber 59 above the piston 56. Consequently, the chambers 62 and 59 are charged to the same pressure so that the brake pipe discharge valve 58 is maintained seated on the annular valve seat 63 during initial charging.

It will also be noted from FIG. 1 of the drawings that the side outlet of the pipe T 188 that is disposed in the pipe 53 is connected by the pipe 187 to the passageway 180 that extends through the pipe bracket 41 and sectionalized casing 10 of the engineer's automatic brake valve device 4 and the body portion 52 of the three-positioned brake pipe cut-out cock 19 and opens at the wall surface of the tapered bore 51 in the body portion 52. While the tapered key 168 of the three-positioned brake pipe cut-out cock 19 occupies its "Lead" position in which it is shown in FIG. 1 of the drawings, the tapered key 168 blanks or laps the end of the passageway 180 that opens at the wall surface of the tapered bore 51. Therefore, fluid under pressure will flow from the main reservoir 3 via pipe 53, pipe T's 231, 288, 344 and 188 therein and pipe 187 to the passageway 180 to charge this passageway with fluid under pressure from the main reservoir 3.

It will be noted from FIGS. 1A and 1B of the drawings that the right-hand end of the hereinbefore-mentioned pipe T 342 (FIG. 1A) is connected by a pipe 406 to the distributing valve device 5 in order that fluid under pressure from the main reservoir can be supplied to the application portion of the distributing valve device 6 so that upon the supply of fluid under pressure to the application piston chamber 44 of the distributing valve device 5, the application portion of the distributing valve device 5 will operate in the usual manner to supply fluid under pressure from the main reservoir 3 to the brake cylinder device 2 to effect an application of the brakes on the locomotive.

To manually effect a service application of the brakes, the engineer will move the brake valve handle 14 (FIG. 1) of the engineer's brake valve device 4 arcuately from its "Running" position to its "Service" position to effect rotation of the rotary valve 12 from the position in which it is shown in FIG. 1 of the drawings to a position in which a cavity (not shown) in the lower face of the rotary valve establishes a communication between the port and corresponding restricted passageway 35 and the atmospheric exhaust port and corresponding passageway 33 to effect venting of fluid under pressure from the chamber 59 above the piston 56 of the equalizing piston device 15 and the equalizing reservoir 49 connected thereto to atmosphere whereupon the equalizing piston device 15 will operate in the usual well-known manner to effect a corresponding reduction in the pressure in the brake pipe 1. When the pressure in the chamber 56 and the equalizing reservoir 49 has been reduced to the pressure corresponding to the degree of brake application desired, the engineer will move the brake valve handle 14 arcuately from its "Service" position to its "Lap" position to effect a cut off of venting of fluid under pressure from the chamber 59 and the equalizing reservoir 49 whereupon the equalizing piston device 15 will operate to effect a corresponding cut off of venting of fluid under pressure from the brake pipe 1.

The equalizing portion of the distributing valve device 5 (FIG. 1B) will operate in response to the above-described reduction in the pressure in the brake pipe 1 in the usual well-known manner to effect the supply of fluid under pressure from the pressure chamber (not shown) of the distributing valve device 5 to the application chamber (not shown) and to the application piston chamber 44 in the application portion to cause the application portion to operate in the usual well-known manner to effect the supply of fluid under pressure from the main reservoir 3 (FIG. 1A) to the brake cylinder device 2 (FIG. 1B) to effect a service application of brakes on the locomotive.

If the locomotive is coupled to a train of cars, the reduction in the pressure in the brake pipe 1 will effect operation of the brake control device on each respective car in the train to cause a corresponding service brake application on each respective car in the train in the usual well-known manner.

To release a "Service" brake application, the handle 14 of the engineer's automatic brake valve device 4 is moved from its "Lap" position to its "Running" position for causing the brake pipe 1 to be recharged to its normal value.

The distributing valve device 5 will operate in response to this increase in the pressure in the brake pipe 1 in the usual well-known manner to effect a release of fluid under pressure from the brake cylinder device 2 to atmosphere to cause a release of the brakes on the locomotive.

If the locomotive is coupled to a train of cars, the brake control valve device on each respective car will operate in response to an increase in the pressure in the brake pipe 1 to its normal charged value to effect a corresponding release of the brakes on each respective car and recharging of the reservoirs associated with the respective brake control valve device on each car in the train.

To effect an emergency application of the brakes, the handle 14 of the engineer's automatic brake valve device 4 is moved to its "Emergency" position to effect rotation of the rotary valve 12 to a corresponding position in which a cavity (not shown) in the lower face of the rotary valve connects the port and corresponding passageway 37 to the atmospheric exhaust port and passageway 33, the cavity being of such size that fluid under pressure will be vented from the port and corresponding passageway 37 and the brake pipe 1 connected thereto at an emergency rate.

The equalizing portion of the distributing valve device 5 (FIG. 1B) will operate in response to the reduction in the pressure in the brake pipe 1 at an emergency rate in the usual well-known manner to effect the supply of fluid under pressure from the pressure chamber to only the application piston chamber 44 in the application portion of the distributing valve device 5 so that the equalization pressure between the pressure chamber and the application piston chamber 44 is higher when an emergency application is made than the equalization pressure obtained between the pressure chamber, the application chamber and the application piston chamber 44 during a service application of the brakes. Furthermore, in the "Emergency" position of the rotary valve 12, a second cavity therein (not shown) connects the port and corresponding passageway 38 to the port and corresponding passageway 29 which is connected to the application piston chamber 44 via application cylinder pipe 43 so that fluid under pressure is also supplied from the feed valve device 20 to the application piston chamber 44. The application portion of the distributing valve device 5 operates in response to this higher equalization pressure and feed valve pressure in the application piston chamber 44 to effect the supply of fluid under pressure from the main reservoir 3 (FIG. 1A) to the brake cylinder device 2 (FIG. 1B) to provide a correspondingly higher pressure in the brake cylinder device 2 to effect an emergency application of brakes on the locomotive.

If the locomotive is coupled to a train of cars, the reduction in the pressure in the brake pipe 1 at an emergency rate will effect operation of the brake control valve device on each respective car in the train in the usual well-known manner to cause a corresponding emergency brake application on each respective car in the train.

To release the emergency brake application, the handle 14 of the engineer's automatic brake valve device 4 is returned to its "Running" position whereupon the brake pipe 1 will be recharged to its normal value.

The distributing valve device 5 will operate in response to this increase in the pressure in the brake pipe 1 to effect venting of fluid under pressure from the brake cylinder device 2 to atmosphere to cause a release of the emergency brake application on the locomotive.

If the locomotive is coupled to a train of cars, the brake control valve device on each respective car will operate in response to the recharging of the brake pipe extending from car to car through the train to the normal pressure carried therein to effect a corresponding release of the brakes on each respective car and recharging of the reservoirs associated with the brake control valve device thereon.

It will be understood in accordance with conventional and well-known practice in the locomotive braking art, that if the engineer releases foot pressure from the pedal 272 of the foot valve device 8 (FIG. 1B) at a time when the brakes are released, a "safety control" brake application will be effected. Without going into detail in this connection, it will be understood that in accordance with well-known arrangements, the release of foot pressure from pedal 272 of the foot valve device 8 in the locomotive brake apparatus herein described effects operation of the brake application valve device 6 (FIG. 1A) to cause a "safety control" brake application by venting fluid under pressure from the equalizing reservoir 49 (FIG. 1) and equalizing chamber 59 above the piston 56 to atmosphere which, in turn, causes the equalizing piston device 15 of the engineer's automatic brake valve device 4 to vent fluid under pressure from the brake pipe 1 to a corresponding degree whereupon the distributing valve device 5 (FIG. 1B) operates in response to this reduction in the pressure in brake pipe 1 to cause an application of the brakes on the locomotive.

If the locomotive is coupled to a train of cars, the brake control valve device on each respective car will operate in response to this reduction in the pressure in the train brake pipe connected to brake pipe 1 on the locomotive to cause a corresponding application of the brakes on each respective car in the train in the usual well-known manner.

When the brake application valve device 6 (FIG. 1A) is operated to cause a "safety control" brake application, the application valve 222 is moved upward from the position shown in FIG. 1A to a position in which the lower end thereof is above the location at which the branch passageway 234c opens at the wall surface of the bore 226. Therefore, fluid under pressure supplied from the main reservoir 3 to the chamber 233 above diaphragm 228 via pipe 53, pipe T 231, pipe and passageway 230, branch passageway 230a, choke 235 and passageway 234 will be vented to atmosphere via branch passageways 234a and 234c, bore 226, passageway and corresponding pipe 261, and the manually operated on-off valve device 262.

Accordingly, in order to release a safety control brake application, the engineer will depress the push button 395 of the on-off valve device 262 to effect counterclockwise rocking of the pivoted lever 396 which is effective to move the hollow plunger 393 downward until the lower end thereof contacts the upper side of the flat disc valve 400 after which further downward movement of hollow plunger 393 moves this valve away from its corresponding annular valve seat 401 to establish a communication between chambers 389 and 403, the latter being closed by plug 404. Upon movement of the lower end of the plunger 393 into contact with the upper side of valve 400, the chamber 389 is cut off from atmosphere to thereby prevent further flow of fluid under pressure from the chamber 233 in the brake application valve device 6 to atmosphere.

If now the engineer depresses the pedal 272 (FIG. 1B) of the foot valve device 8 to disconnect pipe 270 from atmosphere via whistle 274, the application valve 222 of the brake application valve device 6 will be returned to the position shown in FIG. 1A whereupon the equalizing reservoir 49 and the brake pipe 1 can be recharged to cause the distributing valve device 5 to operate to effect a release of the "safety control" brake application on the locomotive.

If the locomotive is coupled to a train of cars, the brake control valve device on each respective car will operate in response to the recharging of the train brake pipe to the normal pressure carried therein to effect a corresponding release of the brakes on each respective car and recharging of the reservoirs associated with the brake control valve device thereon.

Let it now be supposed that the engineer desires to operate the locomotive light, that is not coupled to a train of cars, illegally by eliminating the "automatic" control of the brakes on the locomotive so that a "safety control" brake application will not automatically occur, should he become incapacitated. Therefore, the engineer (1) effects an emergency brake application by manually moving the handle 14 of the engineer's automatic brake valve device 4 arcuately from its "Running" position to its "Emergency" position whereupon an emergency application of the brakes on the locomotive is effected in the manner described above, and (2) he subsequently rotates the tapered key 168 of the three-position brake pipe cut-out cock 19 by means of the handle 174 from its "Lead" position in which it is shown in FIG. 1 of the drawings to a "Trail" position by first exerting a downward pull on the handle 174 until the pin 176 carried by the handle is below the end of the groove 177 corresponding to the "Lead" position, then rotating the handle 174 arcuately through an arc of 180 degrees until the pin 176 is in alignment with that one of the grooves 177 corresponding to the "Trail" position of the three-position brake pipe cut-out cock 19 and thereafter releasing his grip on the handle 174 whereupon the spring 175 is rendered effective to move the handle 174 upward, as viewed in FIG. 1, until the pin 176 carried by the handle abuts the end of the groove 177 corresponding to "Trail" position of the three-position brake pipe cut-out cock 19.

At the time the engineer moved the handle 14 of the engineer's automatic brake valve device 4 to its "Emergency" position, as explained above, a cavity (not shown) in the lower face of the rotary valve 12 established a communication between the port and corresponding passageway 38 (FIG. 1) which is connected to the delivery chamber 199 (FIG. 3) of the feed valve device 20 of the engineer's automatic brake valve device 4 and the port and corresponding passageway 29 which extends through the sectionalized casing 10 and the pipe bracket 41 to the tapped port opening at the bottom face of the pipe bracket 41 and into which is received one threaded end of the application cylinder pipe 43. As hereinbefore stated, the pipe T 375 is disposed in the application cylinder pipe 43 and has its side outlet connected by the pipe 374 to the inlet end of the check valve device 373. Therefore, fluid under pressure was supplied from the delivery chamber 199 of the feed valve device 20 to the left-hand end of the double valve 364 (FIG. 1) via passageway and corresponding port 38, the cavity in the rotary valve 12, port and corresponding passageway 29, application cylinder pipe 43, pipe T 375, pipe 374, check valve device 373 and pipe 372. Fluid under pressure that was thus supplied from the feed valve device 20 to the pipe 372 at the time the engineer moved the handle 14 to its "Emergency" position, flowed from the pipe and corresponding passageway 372 to the chamber 371 (FIG. 4) in the double check valve device 364 and was effective to move the spool type valve 377 downward against the yielding resistance of spring 378 from the position in which it is shown in FIG. 4 until the lower end thereof abutted the upper end of the spool type valve 376.

When the tapered key 168 of the three-position brake pipe cut-out cock 19 is rotated to its "Trail" position, subsequent to effecting an emergency brake application, the passageway 186 therein establishes a communication between the passageway 180, which is supplied with fluid under pressure from the main reservoir 3 as hereinbefore explained and the passageway 182.

Therefore, upon the tapered key 168 being rotated to its "Trail" position, fluid under pressure at main reservoir pressure will flow from the passageway 180 to the passageway 182 via the passage 186 in key 168 and thence to the right-hand end of the double check valve device 364 shown in FIG. 1 of the drawings via pipe 189, pipe T 190 and pipe 363.

As can be seen from FIG. 4 of the drawings, fluid under pressure thus supplied to the pipe 363 flows therefrom to the chamber 370 and passageway 386 in the double check valve device 364. The fluid under pressure thus supplied to the chamber 370 is effective to move the spool type valves 376 and 377 upward, since the pressure in the main reservoir 3 is greater than the pressure supplied by the feed valve device 20 to the chamber 371, until the spool type valve 377 occupies the position in which it is shown in FIG. 4 and the upper end of the spool type valve 376 abuts the lower end of the spool type valve 377, in which position the peripheral annular groove 379 on the spool type valve 376 establishes a communication between the passageways 382 and 384.

Therefore, upon the spool type valves 376 and 377 reaching their upper position described above, the fluid under pressure present in the chamber 371, which was supplied thereto from the feed valve device 20 at the time the handle 14 of the engineer's automatic brake valve device 4 was moved to its "Emergency" position, will flow from the chamber 371 to the power cut-off switch device 9 (FIG. 1) via the passageway 382 (FIG. 4), peripheral annular groove 379 on the spool type valve 376 (which is now in the position in which groove 379 thereon establishes a communication between passageways 382 and 384), passageway 384, peripheral annular groove 380 on the spool type valve 377, passageway and corresponding pipe 383 (FIG. 1), double check valve device 243, pipe 244, pipe T 245 and pipe 246. Fluid under pressure thus supplied to the power cut-off switch device 9 will operate it to cut off the supply of current to the driving motors (not shown) of the locomotive and thereby bring the locomotive to a stop.

The fluid under pressure supplied to the pipe 244 and pipe T 245, as described above, also flows to the dynamic brake cut-out switch device 9a via the side outlet of the pipe T 245 and the pipe 247 to effect operation of the dynamic brake cut-out switch device 9a to cut out the dynamic brakes at the same time as the power cut-off switch device 9 effects the cut off of electrical current to the driving motors of the locomotive.

From the foregoing, it is apparent that upon the engineer first effecting an emergency application of the brakes and thereafter moving the handle 174 of the three-position brake pipe cut-out cock 19 from its "Lead" position to its "Trail" position to eliminate the "automatic" control of the brakes on a locomotive operating light, that is, not coupled to a train of cars, so that a "safety control" brake application will not automatically occur, should the engineer become incapacitated, the supply of current to the driving motors is automatically cut off so that the locomotive is brought to a stop and the dynamic brakes are cut out. This cutoff of the electrical current to the driving motors so that the locomotive is brought to a stop should discourage the practice by the engineer of eliminating the "automatic" control of the brakes on the locomotive operating light, so that a "safety control" brake application will not automatically occur should the engineer become incapacitated, for, in order to move the locomotive and travel along the track to the desired designation, the engineer must proceed as follows.

It will be remembered that the engineer moved the handle 14 of the engineer's brake valve device 4 from its "Running" position to its "Emergency" position to effect an emergency application of brakes on the locomotive prior to or before he moved the handle 174 of the three-position brake pipe cut-out cock 19 from its "Lead" position to its "Trail" position. Therefore, before the locomotive can be moved, the emergency brake application must be released by the engineer moving the handle 14 from its "Emergency" position back to its "Running" position.

When the handle 14 is returned to its "Running" position, fluid under pressure will be supplied from the feed valve device 20 of the engineer's automatic brake valve device 4 to the brake pipe 1 to recharge it to the normal pressure carried therein. The equalizing piston (not shown) and slide valve (not shown) of the equalizing portion of the distributing valve device 5 (FIG. 1B) will then operate in response to recharging of the brake pipe 1 to the normal pressure carried therein to return to their release position in which the application piston chamber 44 and the application pipe 43 and corresponding passageway in the distributing valve device 5 are connected via a passageway (not shown) in the slide valve in the equalizing portion to one end of a passageway and corresponding pipe 407, the opposite end of which is connected to a tapped port opening at the bottom face of the pipe bracket 41 (FIG. 1) from which tapped port a correspondingly numbered passageway extends through the pipe bracket 41 and the sectionalized casing 10 of the engineer's automatic brake valve device 4 and the main section 82 of the independent brake valve device 18 (FIG. 2) to the chamber 87 therein.

When the handle 14 of the engineer's automatic brake valve device 4 (FIG. 1) is returned to its "Running" position, the rotary valve 12 is returned to the position in which it is shown in FIG. 1 of the drawings in which the passageway 105 in the rotary valve 12 establishes a communication between the passageway and corresponding port 31 and the atmospheric exhaust port 33. Therefore, upon the return of the equalizing piston and slide valve in the equalizing portion of the distributing valve device 5 (FIG. 1B) to their release position, fluid under pressure will be vented from the application piston chamber 44 and the application cylinder pipe 43 to atmosphere via the passageway in the equalizing portion slide valve, passageway and corresponding pipe 407, chamber 87 (FIG. 2) in the independent brake valve device 18, passageway 108 and bore 114 in piston 102, chamber 107, past unseated exhaust valve 109, passageways 111 in piston stem 103, exhaust valve chamber 45, passageway and corresponding port 31 (FIG. 1), passageway 105 in the rotary valve 12 and atmospheric port 33. The application portion of the distributing valve device 5 therefore operates in response to the venting of fluid under pressure from the application piston chamber 44 to effect a release of fluid under pressure from the brake cylinder device 2 to atmosphere to cause a release of the emergency brake application on the locomotive.

At the same time as fluid under pressure is vented from the application piston chamber 44 and the application cylinder pipe 43 to atmosphere in the manner just explained, fluid under pressure will also be vented from the pipe 374, connected at one end to the inlet end of check valve device 373 and at the opposite end to the side outlet of the pipe T 375, to atmosphere. However, it will be noted that the check valve device 373 prevents venting of fluid under pressure at this time from the propulsion power-cut-off switch device 9, the dynamic brake cut-out switch device 9a, and the pipes 247, 246, 244, 383 and 372 so that this fluid under pressure is trapped.

Therefore, subsequent to returning the handle 14 of the engineer's automatic brake valve device 4 (FIG. 1) to its "Running" position to cause a release of the emergency brake application on the locomotive, the engineer must return the handle 174 of the three-position brake pipe cut-out cock 19 from its "Trail" position back to its "Lead" position in order to effect a release of fluid under pressure from the propulsion power cut-off switch device 9 and the dynamic brake cut-out switch device 9a so that electric current can again be supplied to the driving motors of the locomotive for moving the locomotive.

Upon returning the handle 174 of the three-position brake pipe cut-out cock 19 to its "Lead" position, the tapered key 168 will be returned to the position in which it is shown in FIG. 1, in which position the passageway 183 therein establishes a communication between the passageway 37 and the passageway 179 which is connected via pipe 184 and pipe T 185 to the brake pipe 1 so that the brake pipe 1 can be recharged, and the passageway 186 therein establishes a communication between the passageway 182 and the passageway 181 which is open at one end to atmosphere. Accordingly, fluid under pressure will now flow from the chamber 370 and passageway 386 (FIG. 4) in the double check valve device 364 to atmosphere via passageway and corresponding pipe 363 (FIG. 1), pipe T 190, pipe 189 and passageways 182, 186 and 181. As fluid under pressure is thus vented from the chamber 370 in the double check valve device 364 to atmosphere, the trapped fluid under pressure present in the pipe 372 (FIG. 1), and therefore also in the chamber 371 (FIG. 4), is effective to move the spool-type valves 377 and 376 downward until the lower end of the spool-type valve 376 abuts the lower gasket 369. In this position of the spool-type valves 377 and 376 in which the lower end of the spool-type valve 377 abuts the upper end of the spool-type valve 376, the peripheral annular groove 379 on the spool-type valve 377 establishes a communication between the passageway and corresponding pipe 383 and the passageway 386. Upon the establishment of a communication between the passageway and corresponding pipe 383 and the passageway 386, the trapped fluid under pressure will be vented from the propulsion power cut off switch device 9 (FIG. 1) to atmosphere via pipe 246, pipe T 245, pipe 244, double check valve device 243, pipe and corresponding passageway 383 (FIG. 4), peripheral annular groove 379 on the spool-type valve 377, passageway 386, chamber 370, passageway and corresponding pipe 363 (FIG. 1), pipe T 190, pipe 189 and passageways 182, 186 and 181, it being noted, as hereinbefore mentioned, that the check valve device 373 (FIG. 1) prevented the release of fluid under pressure from the propulsion power cut-off switch device 9 to atmosphere at the time the handle 14 of the engineer's automatic brake valve device 4 was moved from its "Emergency" position back to its "Running" position, at which time the application cylinder pipe 43, to which the inlet side of the check valve device 373 is connected via pipe 374 and pipe T 375, was vented to atmosphere via the distributing valve device 5, pipe and passageway 407, the independent brake valve device 18, passageway 31, passageway 105 in rotary valve 12 and exhaust passageway 33 in the rotary valve seat 22 and casing section 23 of the engineer's automatic brake valve device 4, as hereinbefore described. At the same time that fluid under pressure is vented from the propulsion power cut-off switch device 9, fluid under pressure will be vented from the dynamic brake cut-out switch device 9a to atmosphere via the pipe 247, pipe T 245 and the path just traced above for the propulsion power cut-off switch device 9.

Subsequent to venting of fluid under pressure from the propulsion power cut-off switch device 9 and the dynamic brake cut-out switch device 9a in the manner described above, electric current can be supplied to the driving motors of the locomotive for again moving it along the track.

A locomotive provided with the fluid pressure brake apparatus shown in FIGS. 1, 1A and 1B will operate satisfactorily as a trailing unit in multiple-unit operation since, while the locomotive is operating as a trailing unit, the supply of current to the driving motors is controlled from the leading unit and the propulsion power cut-off switch device 9 on the trailing unit is not in the power supply circuit to the driving motors at this time, and, therefore, its operation in the manner now to be described is without effect. Likewise, the dynamic brake cut-out switch device 9a on the trailing unit is not in the dynamic brake circuit since the dynamic brake circuit on the trailing unit is controlled from the leading unit.

It will be noted from FIG. 1A of the drawings that fluid under pressure is constantly supplied from the main reservoir 3 to the chamber 338 of the cut-off valve device 297 of the combined transfer and cut-off valve device 7 via pipe 53 and pipe T's 231, 288 and 344 therein, pipe 343, pipe T 342, and pipe corresponding passageway 339. Fluid under pressure thus supplied to the chamber 338 is effective to deflect diaphragm 335 and move diaphragm follower 347 downward to, through the intermediary of stems 350 and 358, effect unseating of valve 359 from its corresponding annular seat 357 to establish a communication between chambers 352 and 355.

If the fluid pressure brake apparatus shown in FIGS. 1, 1A and 1B is the brake apparatus on the leading unit in multiple-unit operation, it will be noted that the fluid under pressure supplied by the distributing valve device 5 (FIG. 1B) to the brake cylinder device 2 via the pipes 286 and 285 when a brake application is effected also flows via the side outlet of pipe T 287, pipe and corresponding passageway 300, chamber 318 (FIG. 1A) in the transfer valve device 296, counterbore 328, bore 327, chamber 325, passageway 302, chamber 355 in the cut-off valve device 297, past now unseated valve 359, bore 354, chamber 352, passageway and corresponding pipe 341 and pipe T 361 to the brake cylinder equalizing pipe 362 which is connected by the usual hoses and hose couplings to the corresponding brake cylinder equalizing pipe on the trailing unit.

Therefore, if the fluid brake apparatus shown in FIGS. 1, 1A and 1B is the brake apparatus on the trailing unit in multiple-unit operation, the brake cylinder equalizing pipe 362 on the trailing unit will be supplied with fluid under pressure from the corresponding brake cylinder equalizing pipe on the leading unit.

To condition the fluid pressure brake equipment shown on FIGS. 1, 1A and 1B for trailing unit operation, the engineer will, by operation of the handle 174 in the manner hereinbefore described in detail, effect rotation of the tapered key 168 (FIG. 1) of the three-position brake pipe cut-out cock 19 from its "Lead" position, in which it is shown in FIG. 1, to its "Trail" position in which the passageway 183 in the tapered key 168 cuts off passageway 37 from the passageway 179 which is connected via pipe 184 and pipe T 185 to the brake pipe 1, and passageway 186 in the key 168 establishes a communication between the passageway 180 and 182 whereupon fluid under pressure flows from the main reservoir 3 to the pipe 189 via the pathway hereinbefore described in detail. Fluid under pressure thus supplied to the pipe 189 flows via pipe T 190 (FIG. 1), pipe 304, pipe T 303 (FIG. 1A) and pipe and corresponding passageway 299 to the chamber 310 (FIG. 1B) in the transfer valve device 296. Fluid under pressure thus supplied to the chamber 310 is effective to deflect the diaphragm 308 downward to first, through the intermediary of diaphragm follower 313 and its stem 316, effect seating of valve 319 on its corresponding valve seat 321 and thereafter effect unseating of valve 329 from its corresponding valve seat 330 to establish a communication between chamber 331 and 325.

The fluid under pressure supplied to the pipe 189, in addition to flowing to the chamber 310 in the manner explained above, also flows to the chamber 370 (FIG. 4) in the double check valve device 364 via the side outlet of pipe T 190 (FIG. 1) and pipe and corresponding passageway 363 to effect upward movement of the spool type valve 376 (FIG. 4) against the yielding resistance of the spring 378 from the position in which it is shown in FIG. 4 to a position in which its upper end abuts the lower end of spool type valve 377, in which position the peripheral annular groove 380 on the spool type valve 376 cuts off communication between the passageway 384 and the passageway 385, and the peripheral annular groove 379 on the spool type valve 376 establishes a communication between the passageways 382 and 384.

The fluid under pressure supplied to the brake cylinder equalizing pipe 362 on the trailing unit from the corresponding brake cylinder equalizing pipe on the leading unit in multiple-unit operation, as described above, flows from the brake cylinder equalizing pipe 362 on the trailing unit to the propulsion power cut-off switch device 9 (FIG. 1) on the trailing unit via the side outlet of the pipe T 361 (FIG. 1A), pipe and corresponding passageway 341, chamber 352 in the cut-off valve device 297, bore 354, chamber 355, passageway 302, chamber 325 in the transfer valve device 296, past the now unseated valve 329, chamber 331, passageway and corresponding pipe 301, pipe T 306, application cylinder pipe 43, the side outlet of pipe T 375 (FIG. 1), pipe 374, check valve device 373, pipe and corresponding passageway 372, chamber 371 (FIG. 4), passageway 382, peripheral annular groove 379 on spool type valve 376 now in its upper position, passageway 384, peripheral annular groove 380 on spool type valve 377, passageway and corresponding pipe 383, double check valve device 243 (FIG. 1), pipe 244, pipe T 245 and pipe 246. However, since the propulsion power cut-off switch device 9 is not in the power supply circuit to the driving motors while the locomotive is operating as the trailing unit in multiple-unit operation, as hereinbefore stated, this supply of fluid under pressure to the propulsion power cut-off switch device 9 is ineffective to cut off the supply of electric current to the driving motors on the trailing unit at this time. Likewise, the supply of fluid under pressure to the dynamic brake cut-out switch device 9a via the side outlet of pipe T 245 and pipe 247 is ineffective to cut out the dynamic brakes on the trailing unit.

An alternative method by which the engineer may attempt to operate the locomotive light, that is, not coupled to a train of cars, illegally by eliminating the "automatic" control of the brakes on the locomotive so that a "safety control" brake application will not automatically occur should he become incapacitated, will now be described, which alternative method of illegal operation, if attempted by the engineer, will effect, when he first makes a brake application by use of the independent brake valve device 18, cutoff of the supply of electric current to the electric driving motors of the locomotive and a cutout of the dynamic brake circuit so that the locomotive will be brought to a stop.

First (1) the engineer effects an emergency brake application by manually moving the handle 14 of the engineer's automatic brake valve device 4 arcuately from its "Running" position to its "Emergency" position whereupon an emergency application of the brakes on the locomotive is effected in the manner hereinbefore described.

Subsequent to effecting an emergency brake application on the locomotive (2) the engineer manually moves the handle 14 arcuately from its "Emergency" position to its "Service" position to correspondingly rotate the rotary valve 12 from its "Emergency" position to its "Service" position.

While the rotary valve 12 (FIG. 1) occupies its "Service" position, it laps port 29 in the rotary valve seat 22 so that the fluid under pressure previously supplied from the feed valve device 20 via the port and corresponding passageway 29 and the application cylinder pipe and corresponding passage 43 to the application piston chamber 44 (FIG. 1B) in the distributing valve device 5, while the rotary valve 12 occupied its "Emergency" position, is trapped so that the emergency brake application on the locomotive remains in effect.

After the engineer has moved the handle 14 arcuately from its "Emergency" position to its "Service" position, as described above, he can effect a release of the previously effected emergency brake application by (3) manually depressing the operating handle 131 (FIGS. 1 and 2) of the independent brake valve device 18.

Referring to FIG. 2 of the drawings, it will be seen that manually depressing the operating handle 131 is effective to rotate it in a counterclockwise direction about the pin 138 to cause downward movement of the actuating plunger 130 against the yielding resistance of the spring 132. Since the flange 134 of the plunger collar 133 is secured to the actuating plunger 130 by means of the pin 315, the flange 134 and plunger collar 133 will move downward with the actuating plunger 130. Therefore, the flange 134 is effective, by reason of its contact with the arms 146 of the yoke formed integral with the left-hand end of the operating arm 144, to tilt or rock the operating arm 144 counterclockwise about the operating arm anchor pin 142 so that the downwardly extending finger 147 of the operating arm 144 is first moved into contact with the left-hand end of the fluted plunger 148 and is thereafter effective, through the intermediary of the fluted plunger 148, to move the flat disc type quick release valve 150 away from its corresponding annular valve seat 151 against the yielding resistance of spring 152 to establish a communication between the chamber 154 and chamber 157 which is open to atmosphere via the passageway 158 in the main section 82 of the independent brake valve device 18.

Upon the establishment of a communication between the chambers 154 and 157, fluid under pressure will flow from the application piston chamber 44 (FIG. 1B) of the distributing valve device 5 to atmosphere via the passageway and corresponding application cylinder pipe 43 and the pipe T's 306 and 375 therein, passageway 29 (FIG. 1) in the pipe bracket 41 and sectionalized casing 10 of the engineer's automatic brake valve device 4, the passageway 94 extending through the sectionalized casing 10 of the engineer's automatic brake valve device 4, and the main section 82 of the independent brake valve device 18 to the chamber 88 (FIG. 2) therein, choke 156, passageway 155, chamber 154, past unseated quick release valve 150, chamber 157, and passageway 158. The application portion of the distributing valve device 5 (FIG. 1B) operates in response to this release of fluid under pressure from the application piston chamber 44 thereof in the usual well-known manner to effect a release of fluid under pressure from the brake cylinder device 2 to cause a release of the previously effected emergency brake application on the locomotive.

It may be noted that the fluid under pressure present in the pipe 374 (FIG. 1) is vented to atmosphere simultaneously as the fluid under pressure is vented from the application piston chamber 44 (FIG. 1B), but the check valve device 373 prevents the venting of fluid under pressure from the pipe 372 (FIG. 1), chamber 371 (FIG. 4) and passageway 382 in the double check valve device 364 so that the fluid under pressure supplied to this pipe, chamber and passageway at the time the handle 14 of the engineer's automatic brake valve device 4 was moved from its "Running" position to its "Emergency" position remains trapped therein when the emergency brake application on the locomotive is released by depressing the operating handle 131 of the independent brake valve 18.

With the previously effected emergency brake application, which completely depleted fluid under pressure in the brake pipe 1, released, and the handle 14 of the engineer's automatic brake valve device 4 (FIG. 1) in its "Service" position, let it now be supposed that the engineer, in his attempt to operate the locomotive illegally (4) moves the handle 174 of the three-position brake pipe cut-out cock 19 from its "Lead" position to its "Trail" position to correspondingly effect rotation of the tapered key 168 from the position in which it is shown in FIG. 1 to a position in which the passageway 183 therein cuts off communication between passageways 37 and 179, and the passageway 186 therein establishes a communication between the passageways 180 and 182. Upon the passageway 186 in the tapered key 168 establishing a communication between the passageways 180 and 182, fluid under pressure will flow from the main reservoir 3 (FIG. 1A) to the chamber 370 (FIG. 4) in the double check valve device 364 via pipe 53, side outlet of pipe T 188 (FIG. 1), pipe 187, passageways 180, 186 and 182, pipe 189, pipe T 190 and pipe and corresponding passageway 363. Fluid under pressure thus supplied from the main reservoir 3 to the chamber 370 (FIG. 4) is effective to move the spool-type valves 376 and 377 upward against the trapped pressure in the chamber 371, since the main reservoir pressure supplied to the chamber 370 is higher than the trapped pressure in the chamber 371, until the upper end of the spool-type valve 377 abuts the upper gasket 369. In this position of the spool-type valves 376 and 377, the peripheral annular groove 379 on the spool-type valve 376 establishes a communication between the passageways 382 and 384, and the peripheral annular groove 380 on the spool-type valve 377 establishes a communicatiton between the passageway 384 and the passageway and corresponding pipe 383. The fluid under pressure trapped in the pipe 372, chamber 371 and passageway 382 in the manner hereinbefore explained, now flows to the propulsion power cut-off switch device 9 via the peripheral annular groove 379 on the spool type valve 376, passageway 384, peripheral annular groove 380 on the spool type valve 377, passageway and corresponding pipe 383, double check valve device 243 (FIG. 1), pipe 244, pipe T 245 and pipe 246, and also to the dynamic brake cut-out switch device 9a via the side outlet of the pipe tee 245 and the pipe 247. The combined volume of the pipes 383, 244, 246 and 247 is such that when the trapped fluid under pressure in the pipe 272 flows into these pipes, the resulting equalization pressure is of such a low value that the propulsion power cut-off switch device 9 and the dynamic brake cut-out switch device 9a are not operated at this time to respectively cut off the supply of electric current to the driving motors of the locomotive and cut out the dynamic brake. Consequently, by operation of the throttle, the engineer can move the locomotive.

However, let it now be supposed that the engineer desires to manually effect a brake application on the locomotive by use of the independent brake valve device 18. To do so (5) he will move the operating handle 131 (FIG. 2) of the independent brake valve device 18 arcuately from its "Release" position into a service zone an extent corresponding to the degree of brake application desired. When the operating handle 131 is arcuately moved into the service zone, the operating shaft 128 and came 126 carried thereon are correspondingly rotated to first effect seating of the exhaust valve 109 on its corresponding annular valve seat 110 and then to effect unseating of the supply valve 95 from its corresponding annular valve seat 96 in the usual well-known manner of operation of self-lapping valves of this type. Upon the unseating of the supply valve 95, fluid under pressure at main reservoir pressure present in the supply valve chamber 55 will flow therefrom past the unseated supply valve 95 to the chamber 87 and thence to the application piston chamber 44 (FIG. 1B) in the application portion of the distributing valve device 5 via bore 89 (FIG. 2), past flat disc valve 91, chamber 88, passageway 94, passageway 29 (FIG. 1) and application cylinder pipe and corresponding passageway 43. Fluid under pressure thus supplied to the application piston chamber 44 (FIG. 1B) will effect operation of the application portion of the distributing valve device 5 in the usual well-known manner to supply fluid under pressure from the main reservoir 3 to the brake cylinder device 2 to cause an application of the locomotive brakes.

The fluid under pressure supplied to the application pipe 43 by operation of the independent brake valve device 18 in the manner just described flows from the application cylinder pipe 43 to the propulsion power cut-off switch device 9 via the side outlet of the pipe T 375 (FIG. 1), pipe 374, check valve device 373, pipe and corresponding passageway 372, chamber 371 (FIG. 4), passageway 382, peripheral annular groove 379 on the spool type valve 376 which is now in its upper position, passageway 384, peripheral annular groove 380 on the spool type valve 377, passageway and corresponding pipe 383 (FIG. 1), double check valve device 243, pipe 244, pipe T 245 and pipe 246. Fluid under pressure also flows from the side outlet of the pipe T 245 to the dynamic brake cut-out switch device 9a via pipe 247. Consequently, when the operating handle 131 of the independent brake valve device 18 is moved into its service zone to a position corresponding to the degree of brake application desired, fluid under pressure is supplied respectively to the propulsion power cutoff switch device 9 to effect the cutoff of electric current to the driving motors of the locomotive and to the dynamic brake cut-out switch device 9a to effect cutout of the dynamic brakes. Therefore, the locomotive will be brought to a stop in response to the engineer moving the handle 131 arcuately into its service zone to a position corresponding to the degree of brake application desired on the locomotive.

In order to restart the locomotive, the engineer must return the handle 131 of the independent brake valve device 18 to its "Release" position and also return the handle 174 (FIG. 1) of the three-position brake pipe cut-out cock 19 from its "Trail" position to its "Lead" position whereupon the double check valve device 364 will operate in the manner hereinbefore described to vent fluid under pressure from the propulsion power cut-off switch device 9 and the dynamic brake cut-out switch device 9a to the atmosphere.

Having now described the invention, what I claim as new and desire to secure by Letters Patent, is:

1. Apparatus operative, in response to intentional and improper operation of the brake apparatus on a locomotive so as to nullify the safety control operation of the brake apparatus, for effecting cutoff of propulsion power for driving the locomotive, said apparatus comprising the combination of:
  (a) a multi-position manually operable engineer's brake valve device,
  (b) a multiple-position manually operable cut-out cock for conditioning the brake apparatus of the locomotive to operate in multiple-unit operation,
  (c) a fluid pressure operated propulsion power cut-off device operable upon the supply of fluid under pressure thereto to cut off the supply of propulsion power for driving the locomotive,
  (d) a double check valve device of the reverse type subject respectively on opposite ends thereof to two supply pressures and operative responsively to the higher of the two supply pressures to effect the supply of the lower of the two supply pressures therethrough,
  (e) a first conduit connecting said engineer's brake valve device to one end of said double check valve device through which the lower of said two supply pressures is supplied upon movement of said engineer's brake valve device from one of its positions to another of its positions,
  (f) a second conduit connecting said manually operable cut-out cock to the other end of said double check valve device through which the higher of said two supply pressures is supplied upon manual operation of said cut-out cock from one of its positions to another of its positions, and (g) a third conduit via which the lower of said two supply pressures supplied through said double check valve device is delivered to said fluid pressure operated propulsion power cut-off device to effect operation thereof to cut off the propulsion power.

2. Apparatus operative, in response to intentional and improper operation of the brake apparatus on a locomotive so as to nullify the safety control operation of the brake apparatus, for effecting cutoff of propulsion power for driving the locomotive, as claimed in claim 1, further characterized in that:

(a) said manually operable cut-out cock has a first position for conditioning the brake apparatus of the locomotive to operate as the leading unit in multiple-unit operation and in which first position it establishes a communication between the other end of said double check valve device and atmosphere for venting fluid under pressure therefrom, and a second position for conditioning the brake apparatus of the locomotive to operate as a trailing unit and in which second position it closes the said communication and establishes another communication for effecting the supply of fluid under pressure to the other end of said double check valve device, and (b) a one-way flow means is interposed in said first conduit to prevent back flow of fluid under pressure in the direction from said double check valve device to said engineer's brake valve device whereby, subsequent to the supply of fluid under pressure to said fluid pressure operated propulsion power cut-off device, fluid under pressure cannot be released from said propulsion power cut-off device until said cut-out cock is moved from its second position to its first position to release fluid under pressure from said other end of said double check valve device to cause said double check valve device to establish a communication between said fluid pressure operated propulsion power cut-off device and atmosphere via said cut-out cock.

3. In a locomotive fluid pressure brake apparatus, the combination of:

(a) a brake pipe,
(b) a brake cylinder device,
(c) a main reservoir,
(d) a distributing valve device responsive to variations of pressure in said brake pipe for controlling the supply of fluid pressure from said main reservoir to said brake cylinder device and the release of fluid under pressure from said brake cylinder device to atmosphere,
(e) a fluid pressure operated propulsion power cut-off device operable to cut off the supply of propulsion power for driving the locomotive,
(f) an engineer's brake valve device having a multi-position manually operable automatic portion for effecting variations in the pressure in said brake pipe for causing operation of said distributing valve device and a manually operable independent portion for controlling the operation of said distributing valve device independently of variations of pressure in said brake pipe and for effecting a release of a brake application effected by said manually operable automatic portion,
(g) a multiple-position manually operable cut-out cock having one position for conditioning the brake apparatus so that the locomotive may operate as the leading unit in multiple-unit operation, and a second position for conditioning the brake apparatus so that the locomotive may operate as a trailing unit,
(h) a double check valve device of the reverse type subject respectively on opposite ends thereof to two supply pressures and operative responsively to the higher of the two supply pressures to effect the supply of the lower of the two supply pressures therethrough,
(i) said multiple-position manually operable cut-out cock being effective in its said second position to establish a communication through which the higher of said two unequal supply pressures is supplied from said main reservoir to one end of said double check valve device, and being effective in its said first position to establish a communication between said one end of said double check device and atmosphere via which fluid under pressure is vented therefrom,
(j) said engineer's brake valve device being effective in one of its positions to effect the supply of the lower of said two unequal supply pressures to the opposite end of said double check valve device, and being effective in another one of its positions to establish a communication between said opposite end of said double check valve device and atmosphere,
(k) said double check valve device being operable to a position to establish a communication through which the lower of said two unequal supply pressures is supplied to said fluid pressure operated propulsion power cut-off device only upon the supply of the higher of said two unequal supply pressures to said one end of said double check valve device, and said double check valve device also being effective to establish a communication between said fluid pressure operated propulsion power cut-off device and atmosphere in the absence of said two unequal supply pressures, and
(l) a one-way flow means interposed between said engineer's brake valve device and said double check valve device to prevent back flow of fluid under pressure in the direction from said double check valve device to said engineer's brake valve device whereby, subsequent to the supply of fluid under pressure to said fluid pressure operated propulsion power cut-off device, fluid under pressure cannot be released from said power cut-off device until said cut-out cock is moved from its second position to its first position to release fluid under pressure from said one end of said double check valve device to cause said double check valve device to establish a communication via said cut-out cock between said fluid pressure operated propulsion power cut-off device and atmosphere.

4. A locomotive fluid pressure brake apparatus, as claimed in claim 3, further characterized in that said multiple-position manually operable cut-out cock is provided with two passageways which, while the cut-out cock is in its said one position, respectively, open a first communication between said engineer's brake valve device and said brake pipe and a second communication between said one end of said double check valve device and atmosphere, said cut-out cock in its said second position closing the first and second communications and establishing a third communication between said main reservoir and said one end of said double check valve device.

5. Apparatus operative, in response to intentional and improper operation of the brake apparatus on a locomotive so as to nullify the safety control operation of the brake apparatus, for effecting cutoff of propulsion power for driving the locomotive, as claimed in claim 1, further characterized in that said double check valve device of the reverse type comprises:

(a) a sectionalized casing having a bore therein,
(b) two oppositely arranged fluid pressure operated spool type valves slidably mounted in said bore and subject respectively on their opposite ends to the lower of said two supply pressures and to the higher of said two supply pressures, said two spool type valves, when subject respectively to both of said supply pressures, being movable to one position in which they, in cooperation, establish a communication between said engineer's brake valve device and said fluid pressure operated propulsion power cut-off device, and
(c) a spring interposed between said two fluid pressure operated spool type valves, said spring being effective, while said fluid pressure operated spool type valves are not subject to either of said supply pressures, to move said fluid pressure operated spool type valves from said one position to another position in which said communication between said engineer's brake valve device and said fluid pressure operated propulsion power cut-off device is closed and in which a communication between said propulsion power cut-off device and atmosphere is established to vent fluid under pressure therefrom.

6. A locomotive fluid pressure brake apparatus, as claimed in claim 3, further characterized by:
 (a) a standard type double check valve device of the type having its side outlet connected to said fluid pressure operated propulsion power cut-off device and one end supplied with the lower of said two supply pressures from said double check valve device of the reverse type upon the supply of the higher of said two supply pressures thereto while said multiple-position manually operable cut-out cock occupies its second position, and
 (b) a fluid pressure operated application valve device operable, responsively to a variation from a normal safety control fluid pressure, from one position in which it establishes a venting communication between the other end of said standard type double check valve device and atmosphere to a second position in which said venting communication is closed and a communication is established between said main reservoir and said other end of said standard type double check valve device whereby fluid under pressure is supplied to said fluid pressure operated propulsion power cut-off device, independently of said double check valve device of the reverse type and the position said multiple-position manually operable cut-out cock occupies, to effect cutoff of propulsion power for driving the locomotive.

7. A locomotive fluid pressure brake apparatus, as claimed in claim 3, further characterized by an application cylinder pipe through which fluid under pressure may be supplied from said engineer's brake valve device to said distributing valve device to effect the operation thereof independently of variations of pressure in said brake pipe, said application cylinder pipe having a branch that is connected to the inlet end of said one-way flow means, the outlet end of which is connected to said double check valve device whereby fluid under pressure supplied to said application cylinder pipe while said multiple-position manually operable cut-out cock occupies its second position, flows to said fluid pressure operated power cut-off device via said double check valve device and is released therefrom only when said multiple-position manually operable cut-out cock is returned to its said first position to establish a venting communication via said double check valve device and said multiple-position manually operable cut-out cock in series.

No references cited.

EUGENE G. BOTZ, *Primary Examiner.*